United States Patent [19]

Ooi

[11] Patent Number: 4,680,636
[45] Date of Patent: Jul. 14, 1987

[54] DRIVER CIRCUIT FOR TWO-DIMENSIONAL IMAGE SENSOR

[75] Inventor: Kazushige Ooi, Yokohama, Japan

[73] Assignee: Kabushiki Kaisha Toshiba, Kawasaki, Japan

[21] Appl. No.: 797,019

[22] Filed: Nov. 12, 1985

[30] Foreign Application Priority Data

Nov. 13, 1984 [JP]  Japan .................... 59-237556

[51] Int. Cl.[4] ............................. H04N 3/14
[52] U.S. Cl. .................. 358/213.18; 358/213.25; 358/213.26
[58] Field of Search ................ 358/213, 212

[56] References Cited

U.S. PATENT DOCUMENTS

| | | | |
|---|---|---|---|
| 4,481,538 | 11/1984 | Battson et al. ................ | 358/213 |
| 4,514,765 | 4/1985 | Miyata et al. ................. | 358/213 |
| 4,564,766 | 1/1986 | Kuroda et al. ................ | 358/213 |
| 4,580,170 | 4/1986 | Levine ........................... | 358/213 |

FOREIGN PATENT DOCUMENTS 0073144 3/1983 European Pat. Off. .
0091120 10/1983 European Pat. Off. .
3226732 2/1983 Fed. Rep. of Germany .

OTHER PUBLICATIONS

The Journal of the Institute of Television Engineers of Japan, vol. 37, No. 10; Sone et al.; Oct., 1983.

*Primary Examiner*—Gene Z. Rubinson
*Assistant Examiner*—Stephen Brinich
*Attorney, Agent, or Firm*—Cushman, Darby & Cushman

[57] ABSTRACT

The driver circuit for a two-dimensional, CCD image sensor provides a pulse elimination period before the start of each field shift. During this elimination period, the operation of transmission registers is stopped so that the amplitude of a signal component used for even field shifting substantially matches the amplitude of another signal component used for odd field shifting, such that, as a result, the output signal of the image sensor is free of flickering.

22 Claims, 198 Drawing Figures

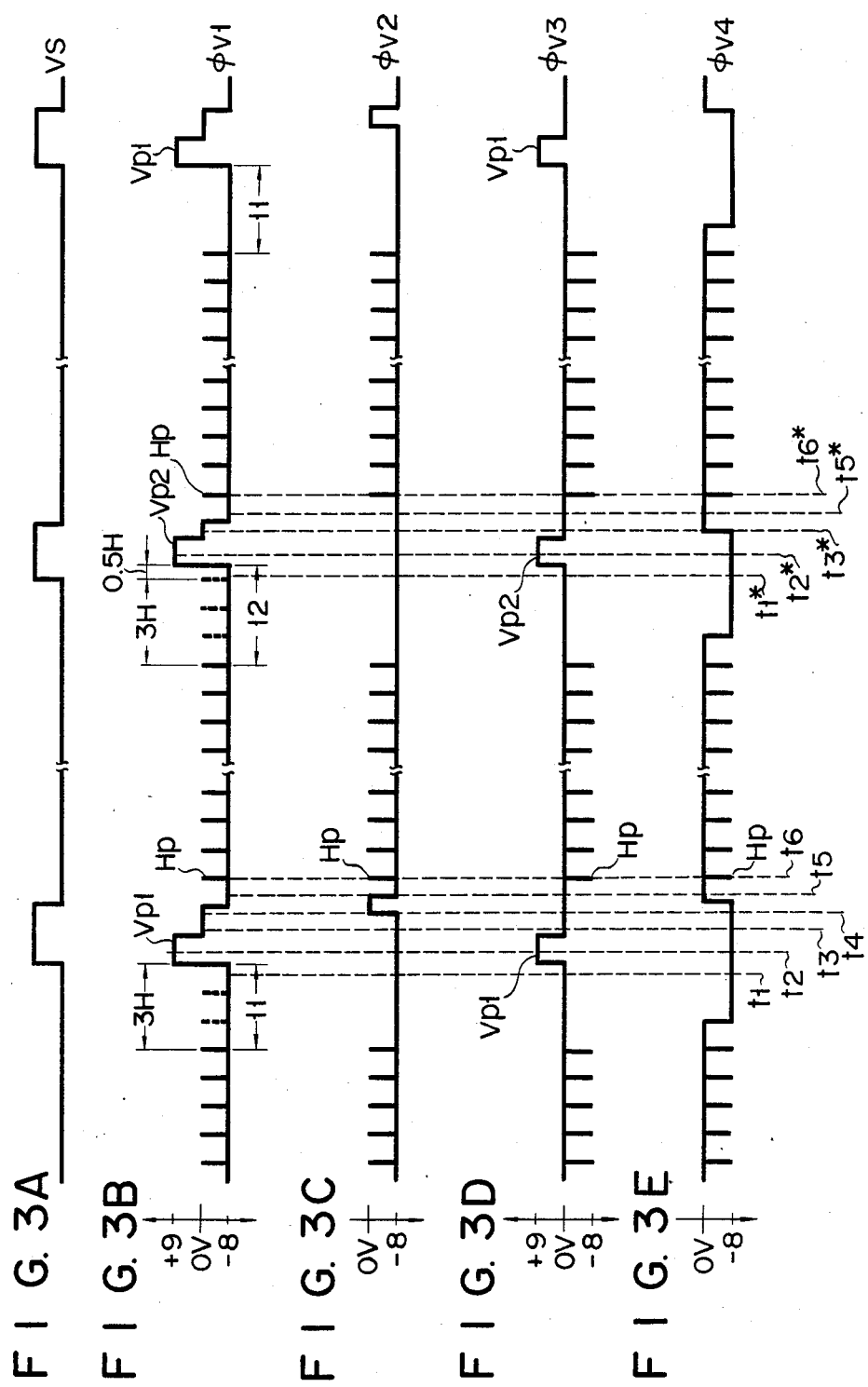

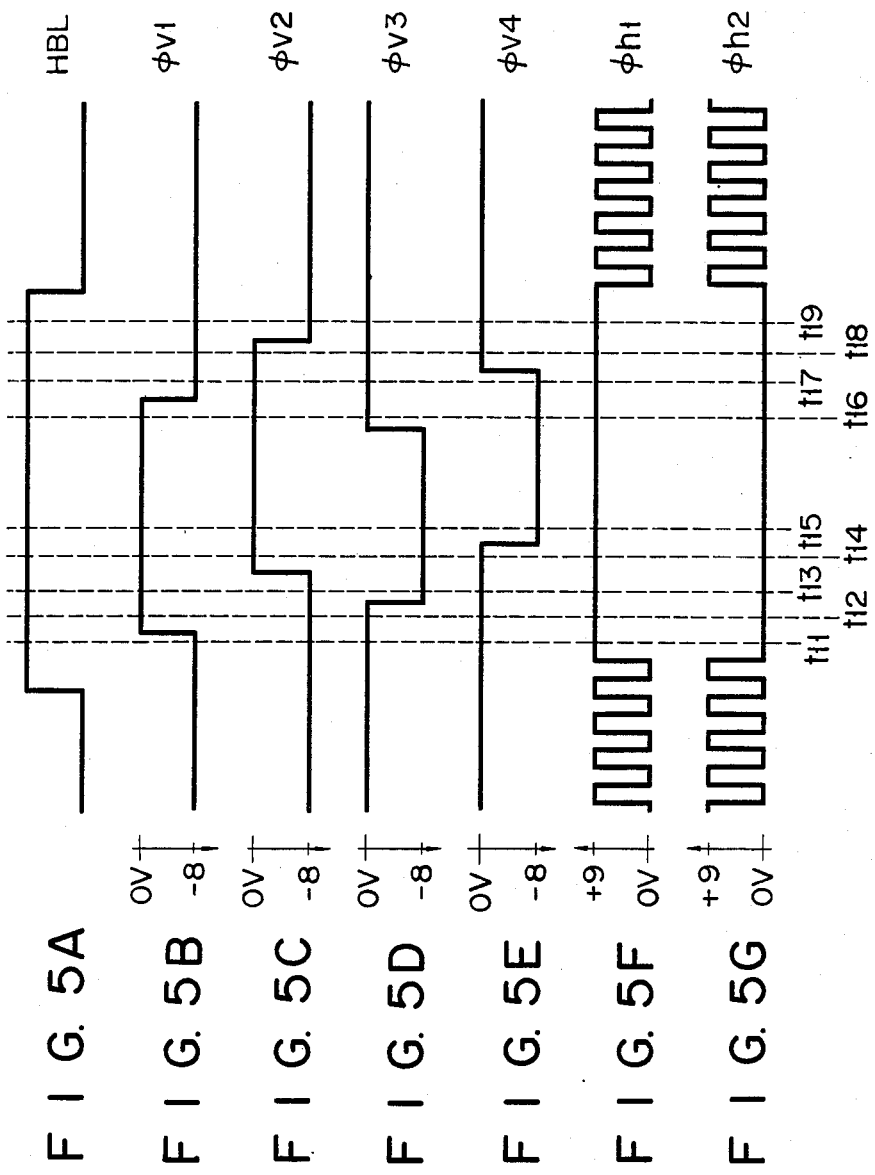

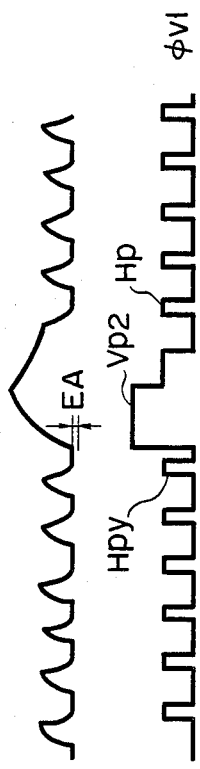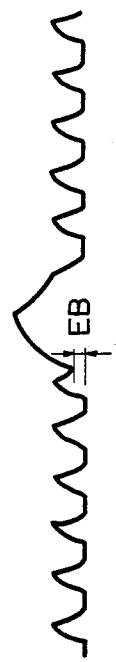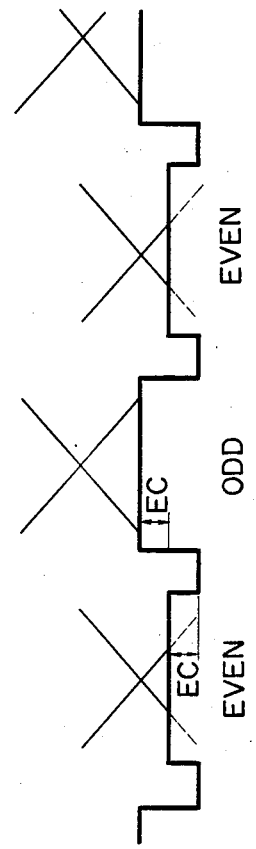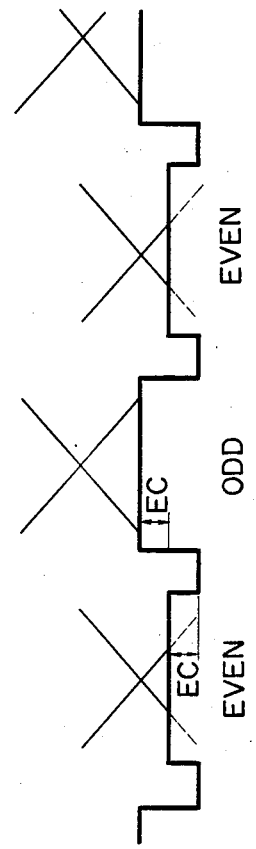
FIG. 7A
FIG. 7B
FIG. 7C
FIG. 7D
FIG. 8

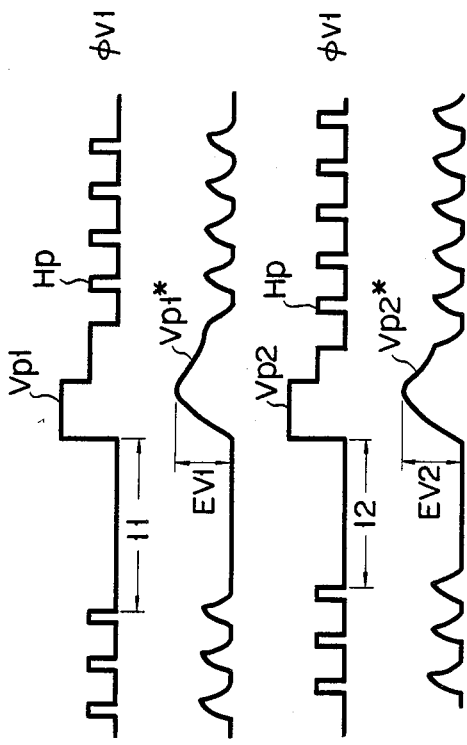
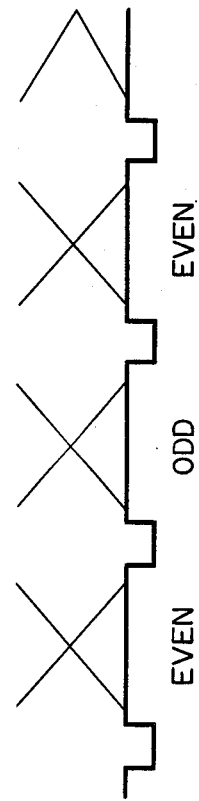
FIG. 9A
FIG. 9B
FIG. 9C
FIG. 9D
FIG. 10

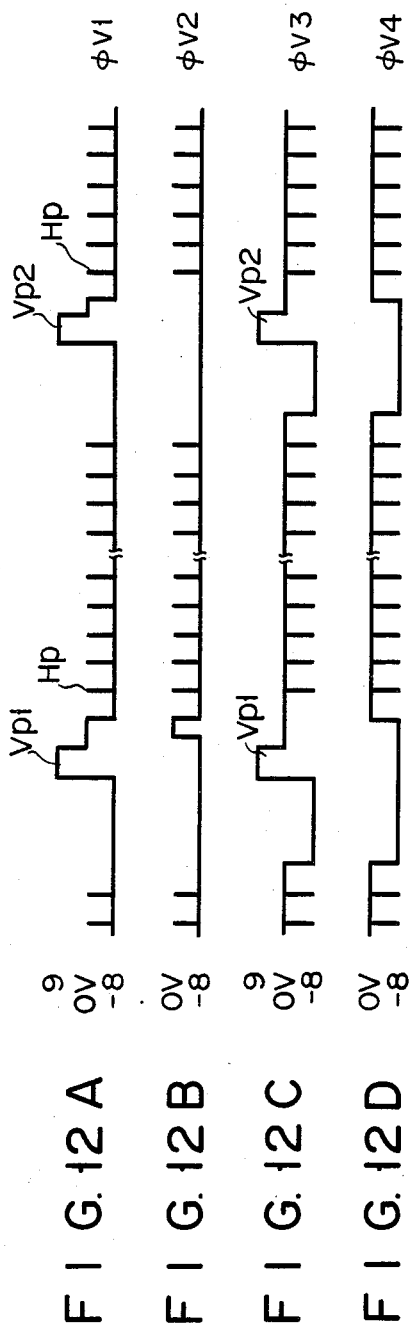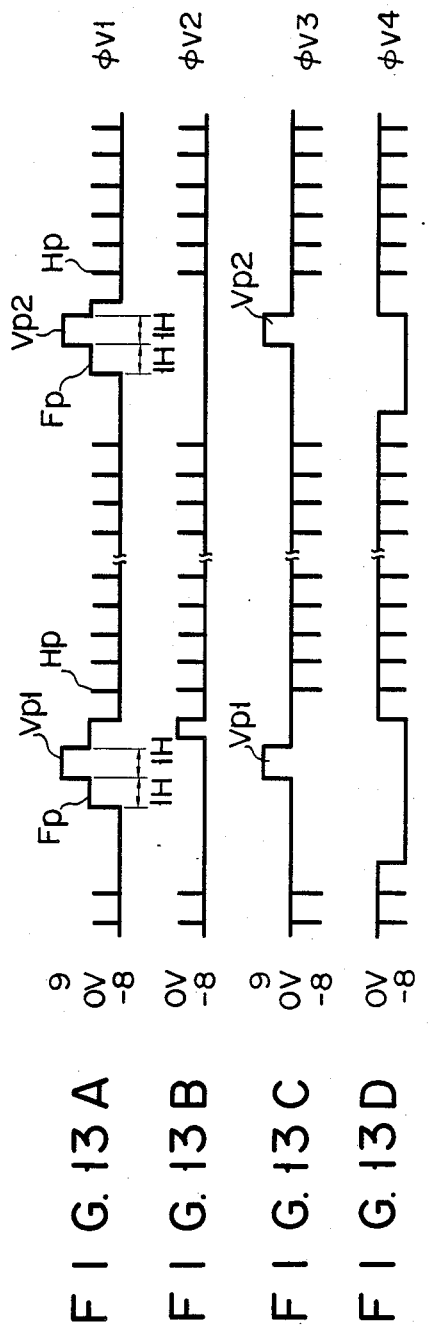

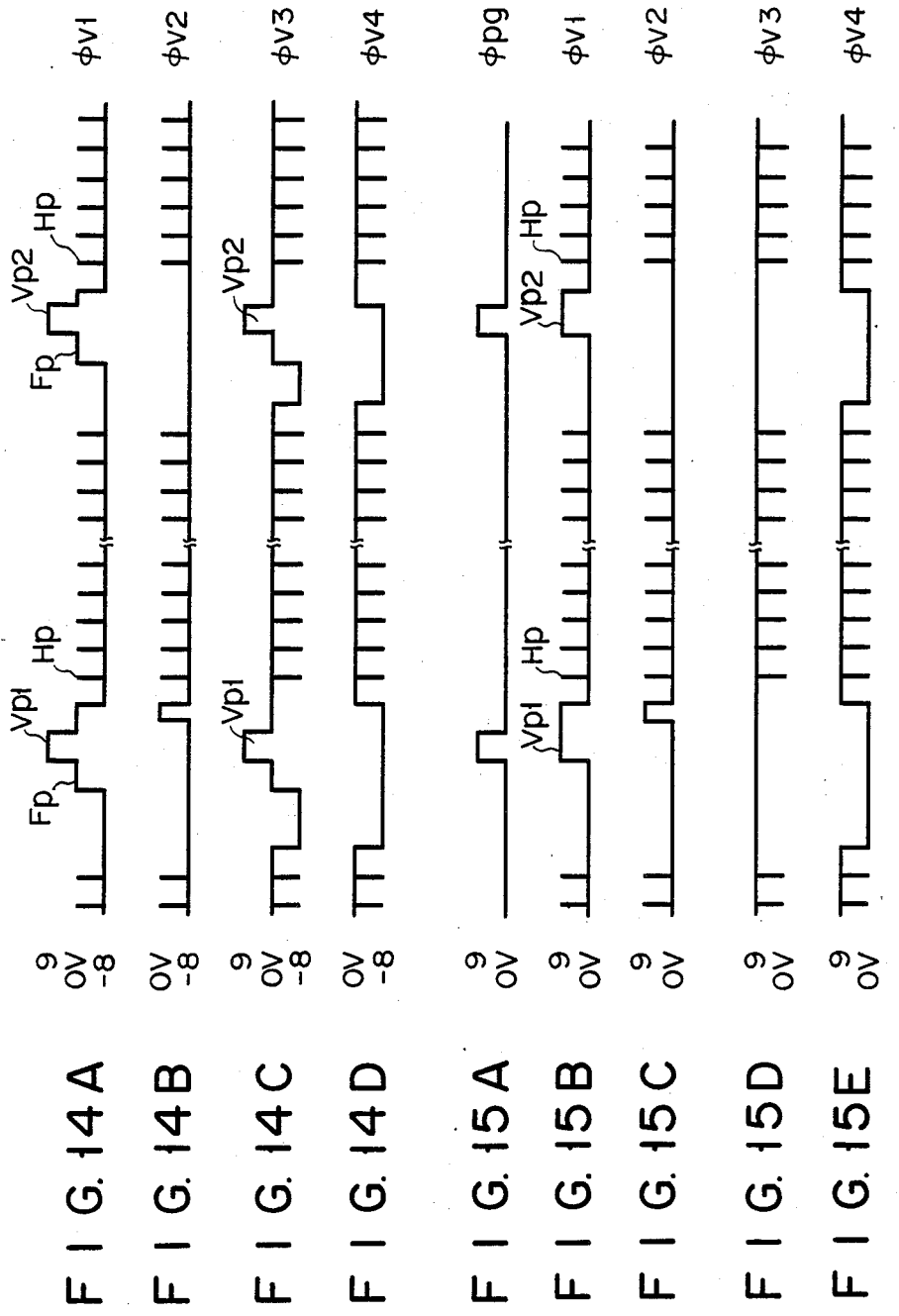

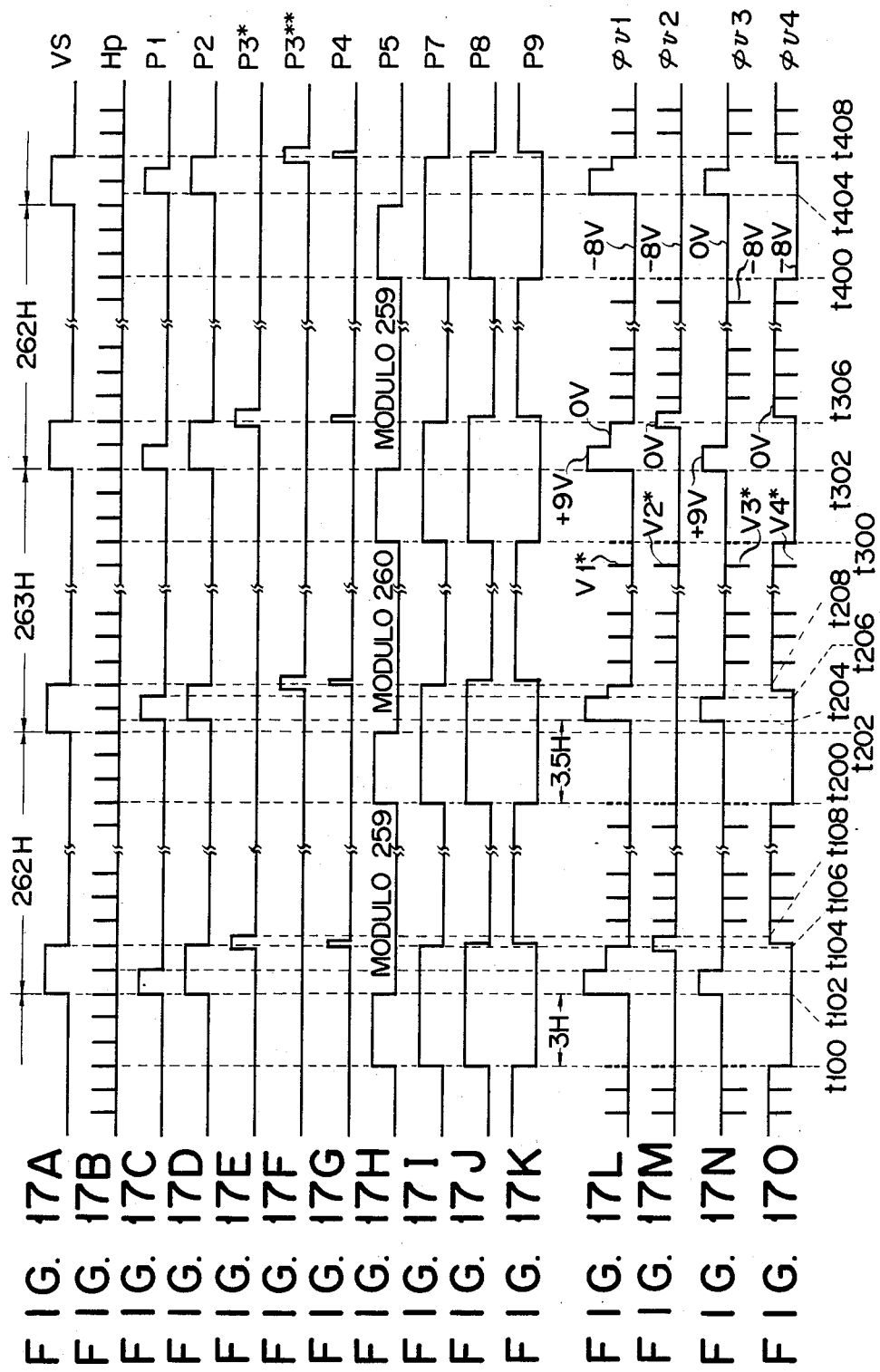

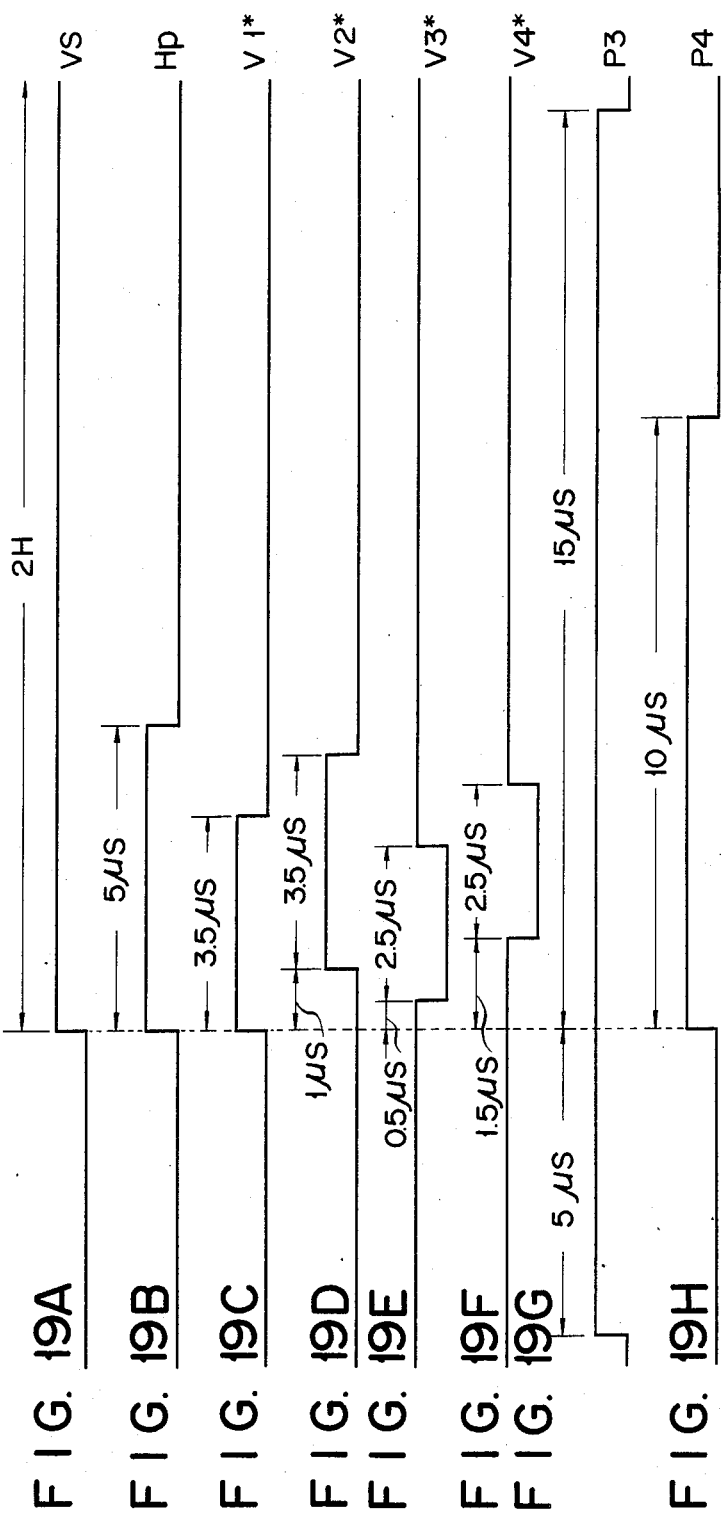

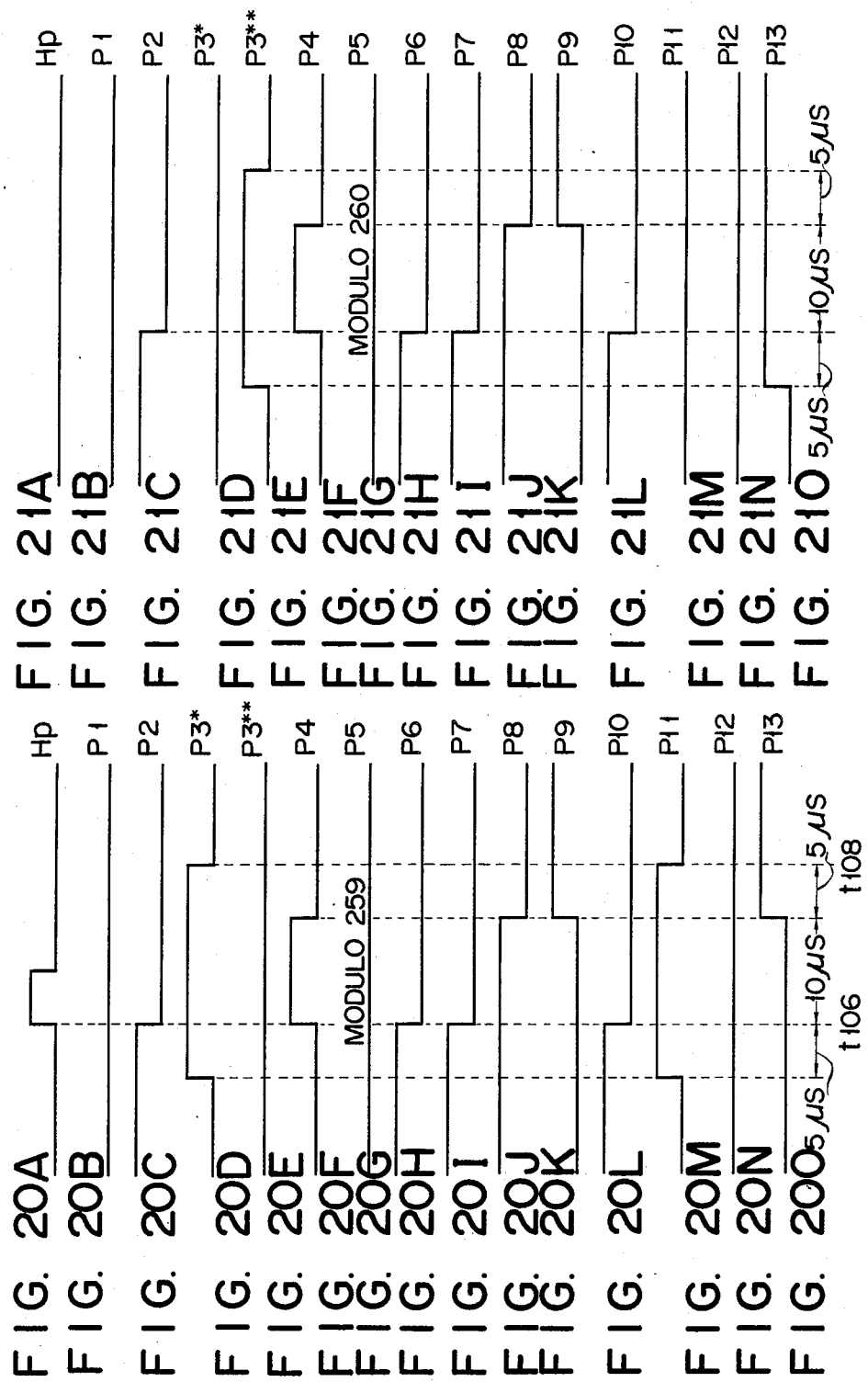

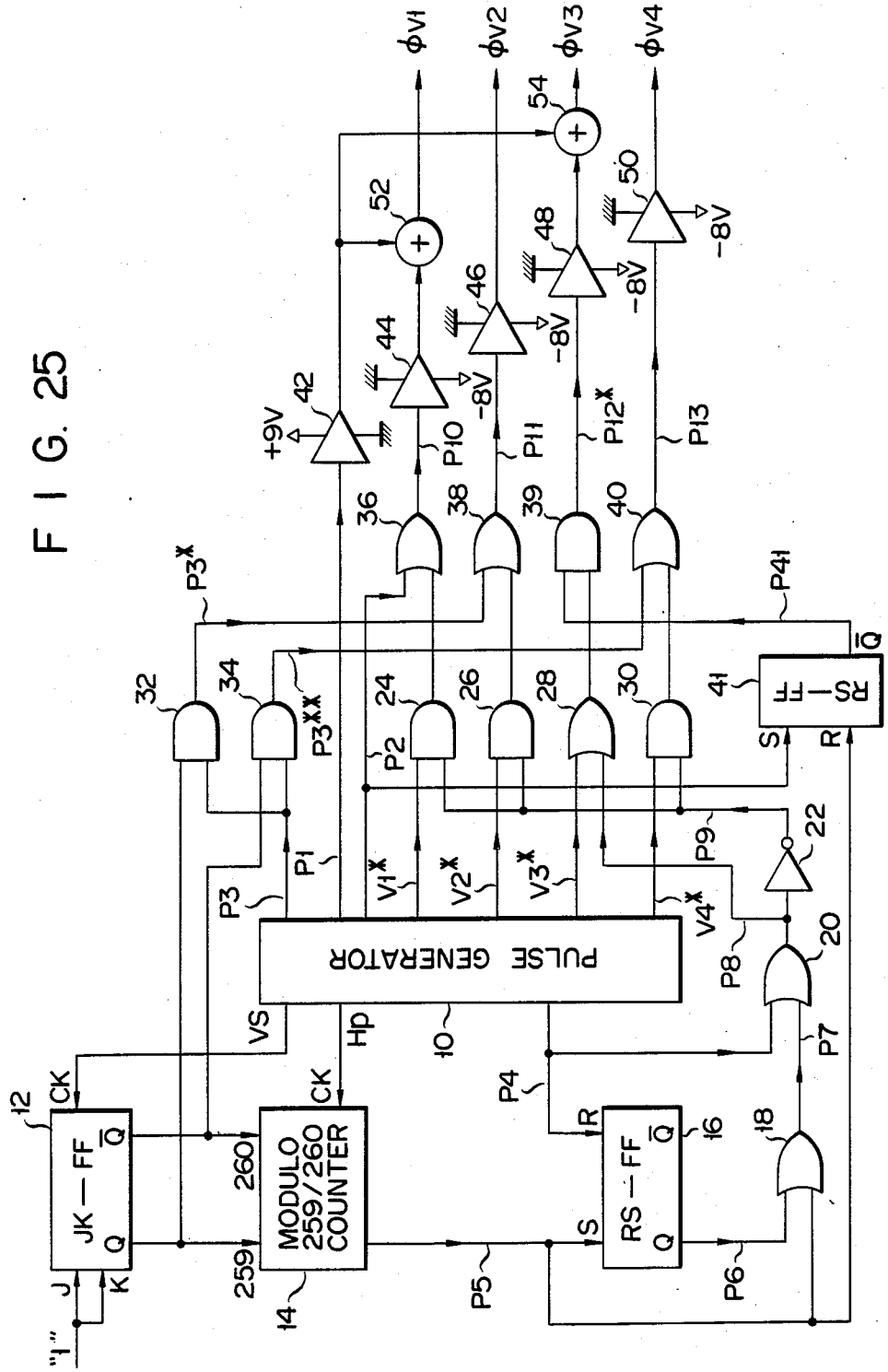
F I G. 25

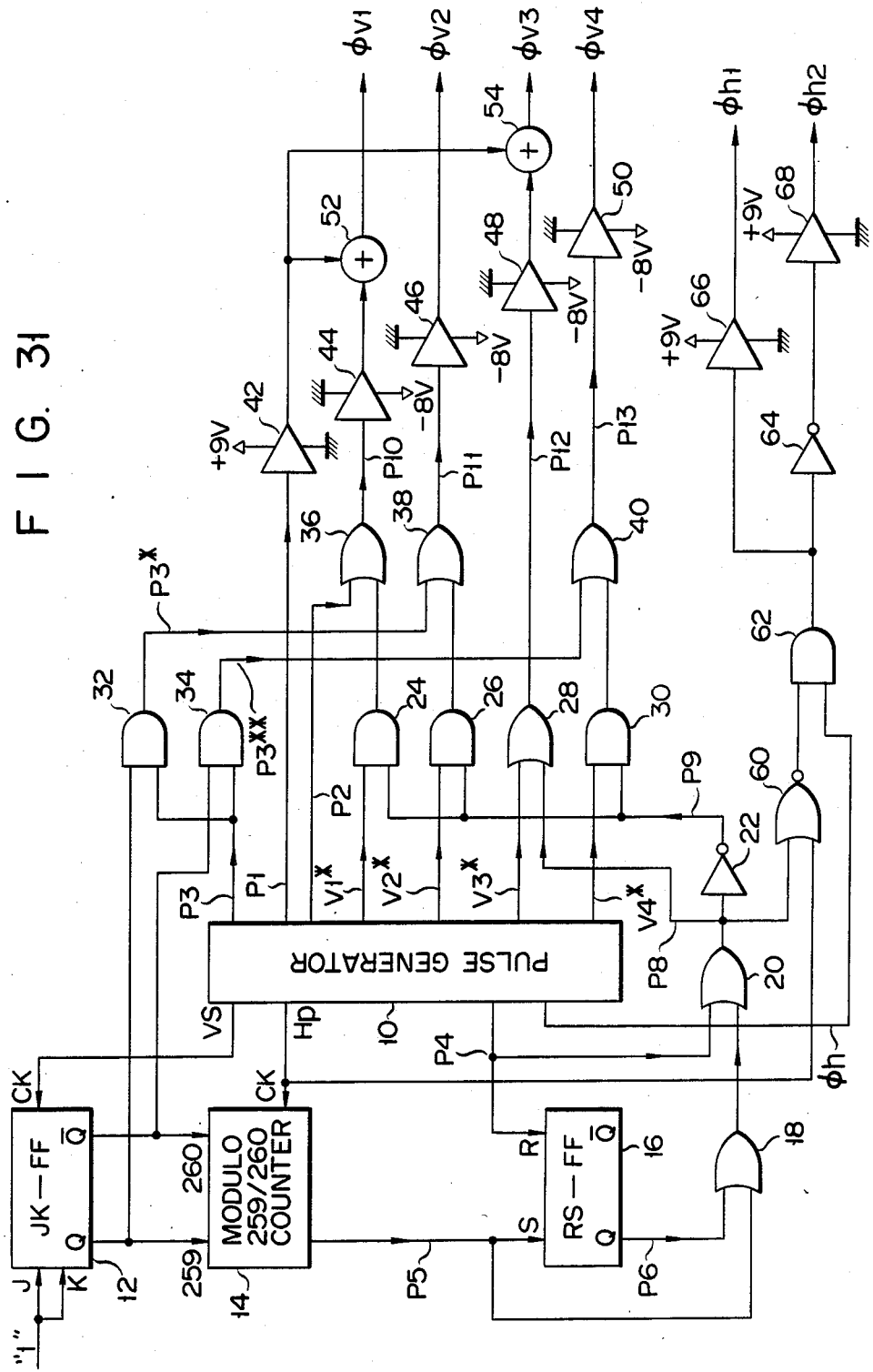

DRIVER CIRCUIT FOR TWO-DIMENSIONAL IMAGE SENSOR

BACKGROUND OF THE INVENTION

The present invention relates to a driver circuit for a two-dimensional, solid-state image sensor, and particularly to a driver circuit for a two-dimensional CCD image sensor operating in a field storage mode.

Two-dimensional CCD image sensors operating in a field storage mode are conventionally used in color TV cameras. In the field storage mode, transmissions for signal charges from photodiodes are carried out for each field. Assume that a two-dimensional CCD image sensor formed of 490 pixels in the vertical direction is applied to an NTSC color TV camera. In such a TV camera, 245 sets of vertical transmission registers are provided for the CCD image sensor, thereby achieving simultaneous readout of signal charges from the 490 photodiodes for each field. In this case, the above readout is performed such that the signal charges from two photodiodes adjacent in the vertical direction are added to each other.

According to a conventional driver circuit for a two-dimensional, CCD image sensor operating in the field storage mode, the interval from the time just after completing the final line shift to the time when the next field shift is effected varies with the change of fields, and the amplitude of field shifting pulses varies for each field. This factor gives rise to and invites the occurrence of flickering in the obtained TV image.

Flickering of the TV image occurs for the following reason. The vertical transmission electrode of a CCD image sensor has distributed resistances and distributed capacitances with respect to the substrate of the CCD semiconductor chip. If the time interval from the final line shift to the next field shift varies with each field change, and if this time interval is not sufficiently longer than one corresponding to the time constant of said distributed resistances and distributed capacitances, then the potential of the field shift pulse obtained just after completing the final line shift is changed for each field. From this, the potential of particular photodiodes in the CCD varies slightly for each field. Under this condition, since the subsequent readout is started from the initial point of the next field, the actualy obtained initial potential of the photodiode deviates slightly from the prescribed initial potential. Such an initial potential deviation will cause a material disadvantage, i.e., the occurrence of flickering, even if the value of this potential deviation is less than 1/100 of the prescribed initial potential.

To be concrete, when the initial potential of the photodiode is adjusted for an even field and the signal charge is read out in an odd field, DC charges corresponding to the initial potential deviation are excessively read out, thereby causing said flickering. Conversely, if the initial potential of the photodiode is adjusted for the odd field and the signal charge is read out in the even field, DC charges coresponding to the initial potential deviation are lacking in the readout signal charge, such that this too causes flickering.

Flickering is liable to occur whenever the resistivity of the CCD substrate is relatively high and/or the time constant formed by the distributed resistances and distributed capacitances of the vertical transmission electrode with respect to the CCD substrate is relatively large. From this, it can be deduced that flickering is highly likely to occur when the CCD has a P-well structure or VOD (Vertical Overflow Drain) structure.

SUMMARY OF THE INVENTION

It is, accordingly, an object of the present invention to provide a driver circuit for a two-dimensional, solid-state image sensor, by which the output signal from the image sensor can be rendered free of flickering.

To achieve the above object, the driver circuit for the two-dimensional, solid-state image sensor according to the present invention provides a pulse elimination period before the start of field shifting. During this elimination period, the operation of transmission registers is stopped so that the initial potential deviation of photodiodes is prevented for each field.

By the provision of the above elimination period, the output signal of the two-dimensional, solid-state image sensor according to the present invention is free of flickering.

BRIEF DESCRIPTION OF THE DRAWINGS

FIG. 3A shows vertical sync signal VS;

FIGS. 3B–3E show waveforms of vertical driving signals $\phi v1$–$\phi v4$ used for the CCD image sensor of FIG. 1, which signals ($\phi v1$–$\phi v4$) are provided in an embodiment of the present invention;

FIG. 5A shows horizontal blanking signal HBL;

FIGS. 5B–5E show waveforms of enlarged line shift pulses contained in vertical driving signals $\phi v1$–$\phi v4$;

FIGS. 5F and 5G show waveforms of enlarged horizontal driving signals $\phi h1$ and $\phi h2$ used together with the signals of FIGS. 5B–5E;

FIGS. 7A–7D explain how an initial potential deviation, which causes flickering, occurs;

FIG. 8 shows observed patterns of CCD outputs obtained in accordance with the signals shown in FIGS. 7A–7D by using a gray scale, and wherein flickering occurs;

FIGS. 9A–9D explain how an initial potential deviation causing the flickering is eliminated;

FIG. 10 shows observed patterns of CCD outputs obtained in accordance with the signals as shown in FIGS. 9A–9D by using a gray scale, and wherein no flickering occurs;

FIGS. 12A-12D show waveforms of vertical driving signals $\phi v1$-$\phi v4$ used for a two-dimensional, CCD image sensor, which are provided in another embodiment of the present invention;

FIGS. 13A-13D show waveforms of vertical driving signals $\phi v1$-$\phi v4$ used for a two-dimensional, CCD image sensor, which are provided in another embodiment of the present invention;

FIGS. 14A-14D show waveforms of vertical driving signals $\phi v1$-$\phi v4$ used for a two-dimensional, CCD image sensor, which are provided in another embodiment of the present invention;

FIG. 15A shows photo gate signal $\phi pg$ synchronized with a vertical sync signal;

FIGS. 15B-15E show waveforms of vertical driving signals $\phi v1$-$\phi v4$ used for a two-dimensional, CCD image sensor, which are provided in another embodiment of the present invention;

FIGS. 17A-17O show waveforms of various pulses and explain how vertical driving signals $\phi v1$-$\phi v4$, shown in FIGS. 3B-3E, are obtained;

FIGS. 19A-19H show the pulse intervals of some pulses generated by the signal generator of FIG. 18;

FIGS. 20A-20O show waveforms of various pulses generated by the signal generator of FIG. 18, which are obtained during an even field;

FIGS. 21A-21O show waveforms of various pulses generated by the signal generator of FIG. 18, which are obtained during an odd field;

FIG. 25 shows a block configuration of a signal generator which generates the signals shown in FIGS. 12A-12D;

FIG. 31 shows a block configuration of the signal generator which generates the signals shown in FIGS. 16A-16F.

DETAILED DESCRIPTION OF THE PREFERRED EMBODIMENTS

In the following the preferred embodiments of the present invention will be described with reference to the accompanying drawings.

Figure 1:
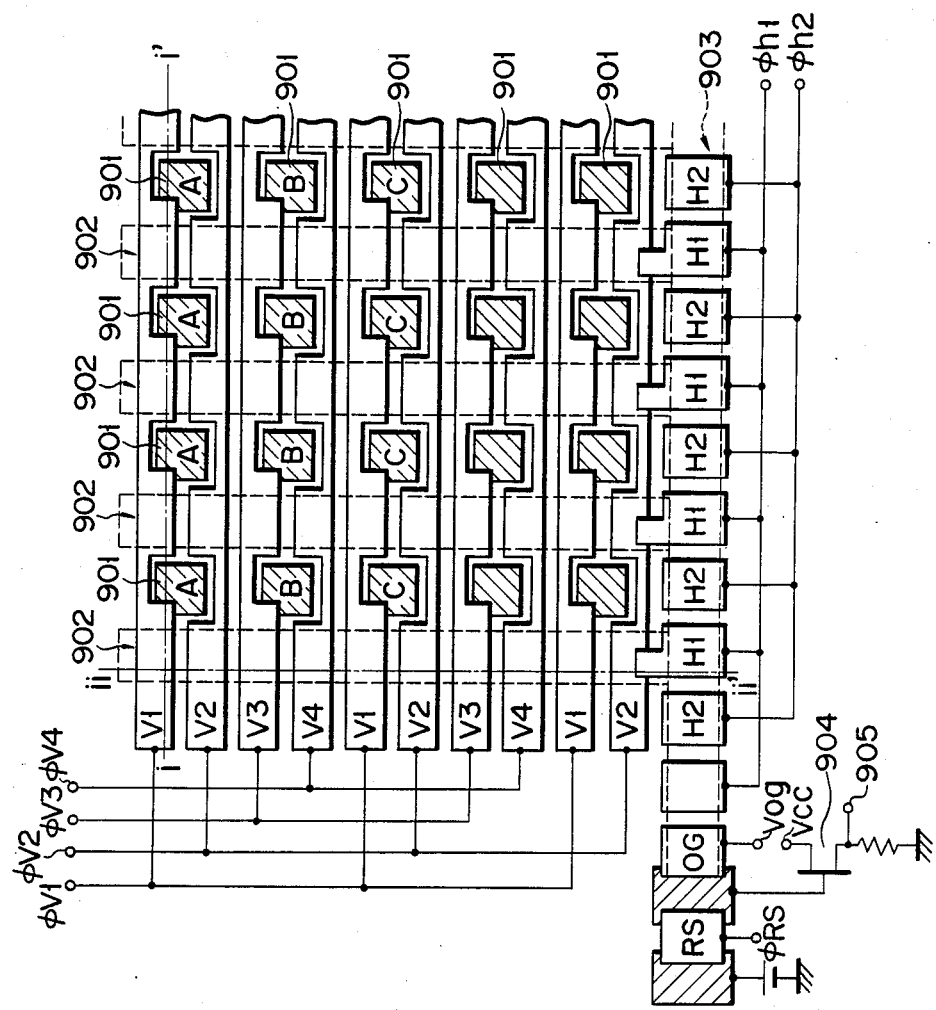
FIG. 1 shows the typical configuration of an interline transmission-type, two-dimensional CCD image sensor.

FIG. 1 shows a part of an interline transmission type two-dimensional CCD image sensor which may be applied to an NTSC color TV system. This image sensor is assumed to be formed of 400 horizontal pixels and 490 vertical pixels. These pixels are made up of photodiodes 901, for example. Such photodiodes may be obtained by implanting N-type ions into a P-type semiconductor substrate. In this substrate, 245 (=490/2) vertical transmission registers (CCD shift registers) 902 are formed as buried channels by implanting N-type ions. Similarly, horizontal transmission register (CCD shift register) 903 is formed by the N-ion implantation. The P-substrate formed of the above vertical/horizontal registers is covered with an insulation layer ($SiO_2$ layer). Then, polysilicon, vertical transmission electrodes V1 to V4, and polysilicon, horizontal transmission electrodes H1 and H2 are formed, via the insulation layer, over the vertical and horizontal registers. The driver circuit of the present invention may be adapted to the image sensor of FIG. 1.

Vertical transmission electrodes V1 and V3 partly overlap each photodiode 901. Such partial overlapping between electrodes V1, V3 and each diode 901 is necessary to achieve field shifting (details will be described later.)

Horizontal transmission electrodes H1 are located at the respective ends of vertical transmission registers 902, so that the electrodes of vertical transmission registers 902 partly overlap horizontal transmission electrodes H1, respectively. Horizontal transmission electrodes H1 and H2 are alternatively arranged over horizontal transmission register 903. Each of electrodes H1 receives horizontal transferring signals $\phi h1$, and each of electrodes H2 receives horizontal transferring signals $\phi h2$. The signal charges are read out, as serial data, from FET 904 via output gate OG. The opening/closing of gate OG is controlled by output gate signal Vog, and the gate of FET 904 is reset by a reset signal %RS applied to a reset electrode RS.

Figure 2A:
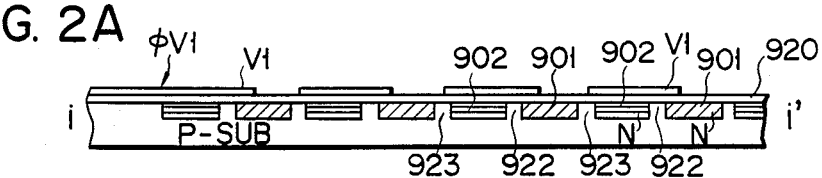
FIG. 2A is a sectional view obtained along the line i—i' shown in FIG. 1.

FIG. 2A is a sectional view of the CCD image sensor obtained along the line i—i' shown in FIG. 1. FIGS. 2B-2E illustrate potential conditions in the potential well of the CCD image sensor, and explain the field shifting.

Figure 2B:
FIGS. 2B–2E, which illustrate potential conditions in the potential well of the CCD image sensor, explain the field shifting in the CCD image sensor of FIG. 1.

Assume that the potential of signal $\phi v1$, applied to vertical transmission electrode V1 shown in FIG. 2A, is zero ($\phi v1=0$ V). In this case, the potential of photodiode 901 under insulation layer ($SiO_2$) 920 is changed from a first potential to a second potential. The first potential is obtained when the final signal charge of a certain field is transferred from photodiode 901 to vertical transmission register 902. The second potential is determined by the light-excited electron 921 gathered at photodiode 901. At the location of photodiode 901 and that of vertical transmission register 902 are overlapping region 922 and nonoverlapping region 932, between electrode V1 and diode 901. When the potential at electrode V1 is 0 V, the potential condition of each of regions 922 and 923 is noninverted or unchanged, and overlapping region 922 is electrically isolated from nonoverlapping region 923. At the region of vertical transmission registers 902, certain potential wells 9020, each of whose potential is defined by the potential at electrode V1, are formed (FIG. 2B).

Figure 2C:

When the potential of signal $\phi v1$ is changed from a low level (e.g., 0 V) to a high level (e.g., 9 V), respective potential wells under overlapping regions 922 as well as potential wells 9020, become deeper than those obtained for $\phi v1=0$ V (FIG. 2C). At this time, the potential of nonoverlapping regions 923 is substantially free from the potential of electrode V1, and the potential wells under regions 923 are retained at shallow positions (0 V positions).

Figure 2D:
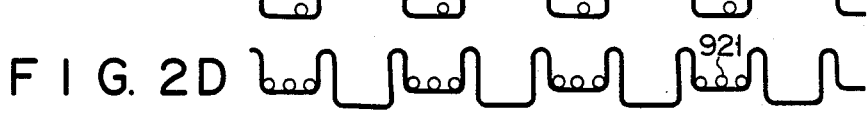

More concretely, when the potential of signal $\phi v1$ is changed to the high level, a certain potential inversion layer having a given inversion potential is formed at the boundary between the $SiO_2$ insulation layer 920 and the substrate surface. Then, the potential value at overlapping regions 922 is smaller than that at vertical transmission registers 902. At this time, if light has been projected onto photodiodes 901, the potential at the region of these photodiodes is enhanced by the light-excited electron, so that the potential of this photodiode region exceeds the inversion potential at overlapping regions 922. As a result, electrons which correspond to a signal charge flow from photodiode 901 to vertical transmission register 902 until the potential of regions 922 becomes equal to that of diodes 901. Subsequently, the potential of all of photodiodes 901 becomes equal to that of region 922. This is the field shifting. Such a flow of signal charge from diodes 901 to registers 902 is performed for each field shift. After performing field shifting and when the potential of signal $\phi v1$ returns to 0 V, the signal charge transmission from photodiodes 901 to vertical transmission registers 902 is completed (FIG. 2D).

Figure 2E:

When the potential of signal $\phi v1$ is changed from the low level (0 V) to a lower level (e.g., $-8$ V), the potential wells under overlapping regions 922 become shallower than those obtained for $\phi v1=0$ V (FIG. 2E). Thus, the potential difference between photodiodes 901 and vertical transmission registers 902 becomes zero. At this time, when the high potential (9 V) is applied to next vertical transmission electrode V2, the signal charges are transmitted from registers 902 under electrode V1 to other registers 902 under electrode V2.

Considerarion will now be given to a case where the CCD image sensor of FIG. 1 is operated in a field storage mode, in which the signal charge transmission from the photodiodes is carried out for each field.

When a two-dimensional CCD image sensor with 490 vertical pixels is used for an NTSC TV system, all signal charges from the 490 photodiodes have to be simultaneously read out for each field in the vertical direction. In this case, since the number of the vertical transmission registers 902 is 245, the signal charges stored in two photodiodes adjacent in the vertical direction are added to each other so that the added signal charge is read out. To achieve such a signal charge readout, driving signals $\phi v1-\phi v4$, as shown in FIGS. 3B-3E, are used.

Driving signals $\phi v1-\phi v4$ (FIGS. 3B-3E) have different waveforms but they are synchronized with vertical sync signal VS (FIG. 3A). Such signals, $\phi v1-\phi v4$, are applied to electrodes V1-V4, respectively, of the image sensor shown in FIG. 1. Each of signals $\phi v1$ and $\phi v3$ contains field shift pulses Vp1 and Vp2. The width of pulse Vp1 may be equal to 1H (one horizontal scanning period). The width of pulse Vp2 may also be equal to 1H.

Signal charges obtained at time t1 due to light excitation of the photodiodes of the image sensor are read out and transferred to vertical transmission register 902 in accordance with pulse Vp1 of signals $\phi v1$ and $\phi v3$ (time t2). These signal charges are temporarily stored under electrodes V1 and V2 (time t3). Following this, the signal charges under electrode V1 are transferred via electrode V2 to regions under electrodes V2 and V3 in accordance with signals $\phi v2$ and $\phi v3$ (time t4). Subsequently, the signal charges under electrodes V2 and V3 are further transferred to regions under electrodes V3 and V4 in accordance with signals $\phi v2$, $\phi v3$ and $\phi v4$ (time t5). The signal charges under electrodes V3 and V4 are retained until line shifting is effected at time t6. (How the line shifting is performed will be described later.)

According to the above-mentioned operation, respective signal charges stored in 400 pairs of two photodiodes (e.g., respective pairs of A and B in FIG. 1) adjacent in the vertical direction are added to each other, to complete field shifting.

In the subsequent field (time t1*-t6*), similar but slightly different signal charge addition for the two adjacent photodiodes is performed. Namely, during the process of time t1* to t6*, respective signal charges stored in the other 400 pairs of two photodiodes (e.g., respective pairs of B and C in FIG. 1) adjacent in the vertical direction are added to each other, so that interlaced scanning is effected in conjunction with the former field.

In each vertical transmission register 902, the following signal charge transferring (line shifting) is carried out.

Figures 4A, 4B:
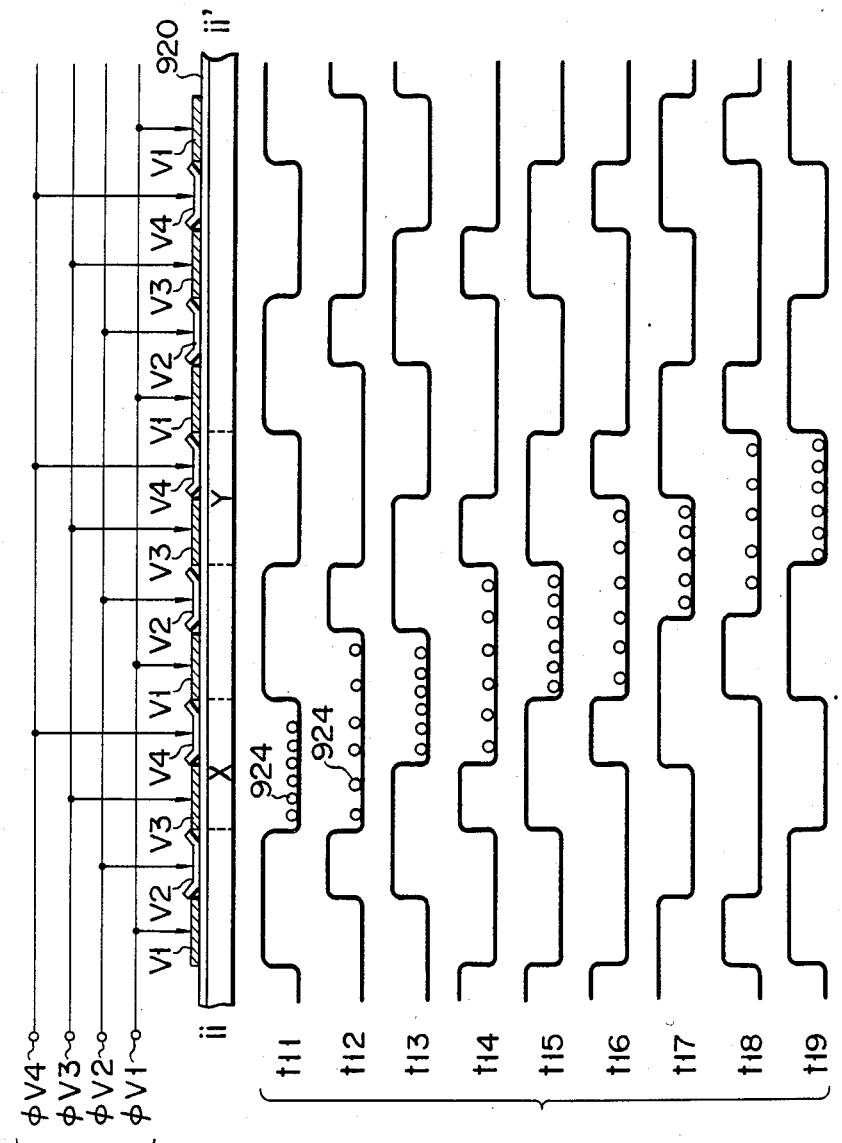
FIG. 4A is a sectional view obtained along the line ii—ii' shown in FIG. 1.
FIG. 4B, which illustrates potential conditions in the potential well of the CCD image sensor, explains the line shifting in the CCD image sensor of FIG. 1.

FIG. 4A is a sectional view of the CCD image sensor obtained along the line ii–ii' in FIG. 1. FIG. 4B illustrates potential conditions in the potential well of the CCD image sensor. Namely, FIG. 4B explains how the line shifting is effected in the CCD image sensor. FIG. 5A shows a horizontal blanking signal HBL. FIGS. 5B-5E show waveforms of line shift pulses Hp applied to electrodes V1-V4. FIGS. 5F and 5G show waveforms of horizontal driving signals $\phi h1$ and $\phi h2$ used together with line shift pulses Hp.

According to field shifting, signal charges 924 from photodiode 901 are stored under electrodes V3 and V4 (t11 in FIG. 4B and FIGS. 5B-5E). When the potential of each of signals $\phi v1$, $\phi v3$ and $\phi v4$ is 0 V while the potential of $\phi v2$ is $-8$ V (t12 in FIGS. 5B-5E), a potential barrier is formed under electrode V2 and an elongated potential well is formed under electrodes V3, V4 and V1 (t12 in FIG. 4B). Then, the distribution of signal charges 924 is spread toward the region under electrode V1. Following this, the potential of each of signals $\phi v2$ and $\phi v3$ is set at $-8$ V while the potential of each of signals $\phi v1$ and $\phi v4$ is retained at 0 V (t13 in FIGS. 5B-5E). Then, the potential barrier is formed under electrodes V2 and V3, and a narrowed potential well is formed under electrodes V4 and V1 (t13 in FIG. 4B). Thus, signal charges 924 are shifted from the region under electrodes V3 and V4 to the region under electrodes V4 and V1.

The above potential changing for signals $\phi v1-\phi v4$ is performed during time t14-t19 (FIG. 4B, FIGS. 5B-5E), so that signal charges 924, stored at region X (preceding line) under electrodes V3 and V4, are shifted to region Y (present line) under electrodes V3 and V4 (FIG. 4A). That is, the signal charges are shifted by one line. This is the line shifting.

As may be seen from FIG. 1, at the final stage of each of vertical transmission registers 902, vertical transmission electrode V2 partly overlaps each electrode H1 of horizontal transmission register 903. Line shifting begins during the final horizontal blanking period (this period is contained within the period of the vertical blanking period). When the potential of signal $\phi v2$ becomes 0 V, electrode V2 is electrically conducted to electrodes H1 so that signal charges are transferred from vertical registers 902 to regions under electrodes H1 of horizontal register 903. The readout of the image sensor for each field is thus performed. Each of the photodiodes in the image sensor keeps its own light signal charge until the next readout is performed.

By repeating the above readout operation of the 4-phase, 3-transmission electrode configuration, signals for one horizontal scanning line are sequentially transferred to horizontal transmission register 903.

Signal charges transferred to horizontal transmission register 903 are shifted toward FET 904 in FIG. 1 in accordance with the clocking of signals $\phi h1$ and $\phi h2$ (FIGS. 5F and 5G). Then, the shifted signal charges are delivered, in the form of serial data, from an output terminal 905 of FET 904.

Figure 6A:
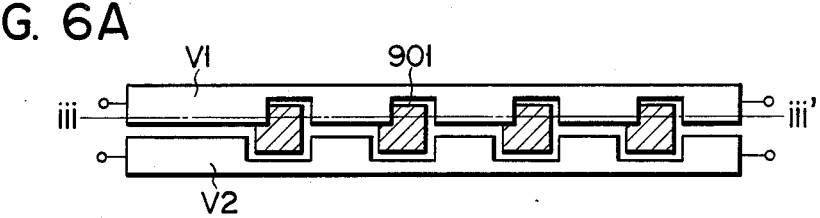
FIG. 6A shows a part of the vertical transmission register in the CCD image sensor of FIG. 1.
Figure 6B:
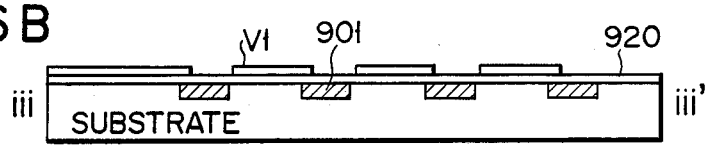
FIG. 6B is a sectional view obtained along the line iii—iii' shown in FIG. 6A.
Figure 6C:
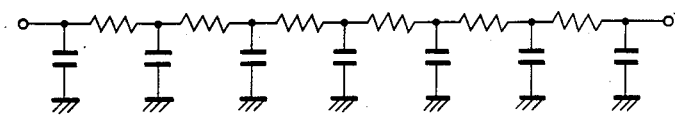
FIG. 6C shows an equivalent circuit when the distributed resistances and distributed capacitances are represented by concentrated circuit parameters.

FIG. 6A shows a part of the vertical transmission register in the CCD image sensor of FIG. 1. FIG. 6B is a sectional view obtained along the line iii—iii' shown in FIG. 6A. FIG. 6C shows an equivalent circuit when the distributed resistances and distributed capacitances are represented by concentrated circuit parameters. FIGS. 7A–7D explain how a initial potential deviation which causes flickering occurs.

The vertical transmission electrode (V1 in FIGS. 6A and 6B) of a CCD has distributed resistances and distributed capacitances to form a low-pass filter or CR delay circuit (FIG. 6C). When the time constant of such a low-pass filter is large, the potential of photodiode 901 under electrode V1 varies, as shown in FIG. 7B or 7D, in response to signal $\phi v1$ in FIG. 7A or 7C. Thus, when the time interval between the last line shift pulse Hpx in an even field and the subsequent field shift pulse Vp1 is not equal to that between the last line shift pulse Hpy in an odd field and the subsequent field shift pulse Vp2, and if these time intervals are not sufficiently longer than one defined by the time constant of said low-pass filter, then an even field shift, start-point potential (initial potential for the even field) EA differs from an odd field shift, start-point potential (initial potential for the odd field) EB. Thus, a potential difference or initial potential deviation EC (=EA−EB) occurs.

When initial potential deviation EC occurs, the observed patterns, using a gray scale, will be as shown in FIG. 8. FIG. 8 shows that in an even field, the readout of signal charges from photodiode 901 is started from a potential lower by potential deviation EC than a predetermined potential value, and that in an odd field, the readout of signal charges from diode 901 is started from a potential higher by deviation EC than the predetermined potential value. When such a deviation of the readout, start-point potential occurs for each odd/even field, flickering is caused.

Incidentally, the above-mentioned gray scale is formed of two sets of monochrome patterns, each of which includes a continuous gradation from white to black. The black side of one of these patterns is located at the left side while the black side of the other is located at the right side, and these patterns are arranged parallel along the vertical direction of the display plane.

Potential difference EC, which causes flickering, is eliminated in the following manner according to an embodiment of the present invention. FIGS. 9A–9D explain how initial potential deviation EC is avoided. FIG. 10 shows observed patterns of CCD outputs obtained in accordance with the signals shown in FIGS. 9A–9D by using a gray scale, and wherein no flickering occurs. Thus, a given number of line shift pulses (e.g., three pulses corresponding to 3H periods), just before each field shift pulse Vp1 and Vp2, are eliminated as shown in FIGS. 9A and 9C. Each of line shift pulse elimination periods 11 (FIG. 9A) and 12 (FIG. 9C) is so determined that the interval of these periods is sufficiently longer than one defined by the time constant of the low-pass filter shown in FIG. 6C. Thus, the initial potential deviation (EA−EB) is substantially eliminated and amplitude EV1 of actual field shift pulse Vp1* of the even field becomes substantially equal to amplitude EV2 of actual field shift pulse Vp2* of the odd field (FIGS. 9B and 9D). Thus, a potential difference or initial potential deviation EC, as shown in FIG. 8, is eliminated (FIG. 10), and, therefore, no flickering occurs.

Figure 11A:
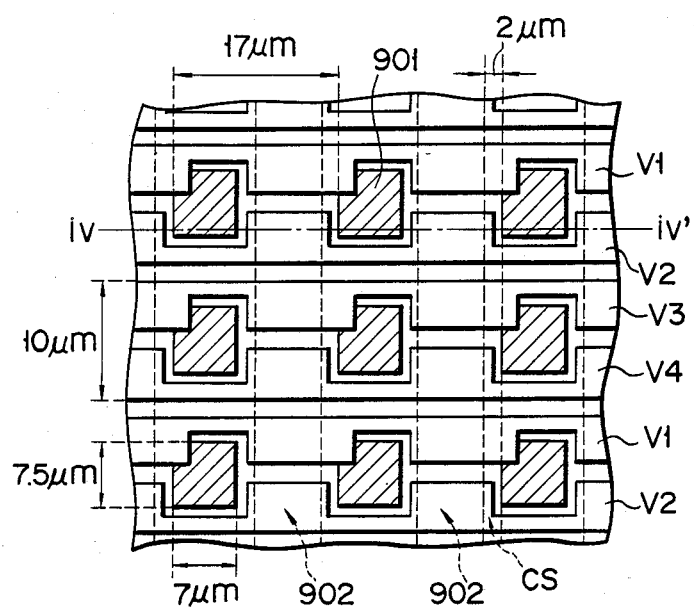
FIGS. 11A and 11B show exemplified dimensions applied to the CCD image sensor of FIG. 1.
Figure 11B:
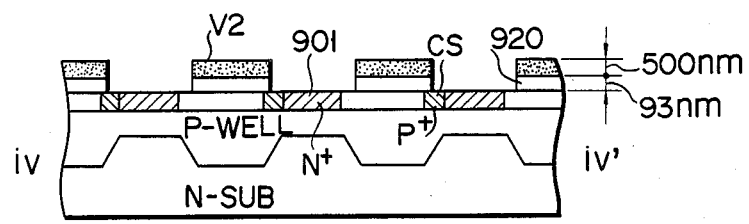

When specific dimensions, as shown in FIGS. 11A and 11B, are applied to the CCD image sensor of FIG. 1, the preferable number of pulses to be eliminated from signal $\phi v1$ would be 2, 3 or 4. (The resistivity of polysilicon electrodes V1–V4 may be 30 ohm/cm$^2$, the N+ concentration of photodiodes 901 may be $1\times10^{16}$ cm$^{-3}$, the P+ concentration of channel stoppers CS may be $1\times10^{16}$ cm$^{-3}$, the impurity concentration of the P well may be $1\times10^{15}$ cm$^{-3}$, and the impurity concentration of the N substrate may be $1\times10^{14}$ cm$^{-3}$.)

Figure 11C:
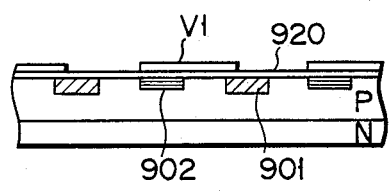
FIGS. 11C and 11D show other structures of the CCD image sensor to which the driver circuit of the present invention can be adapted.
Figure 11D:
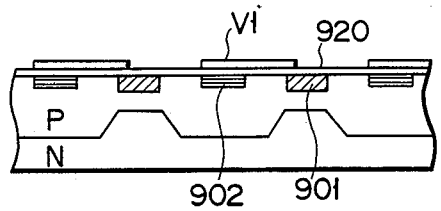

Incidentally, other CCD configurations as shown in FIGS. 11C and 11D may be adapted to the CCD image sensor of FIG. 1.

Figure 18:
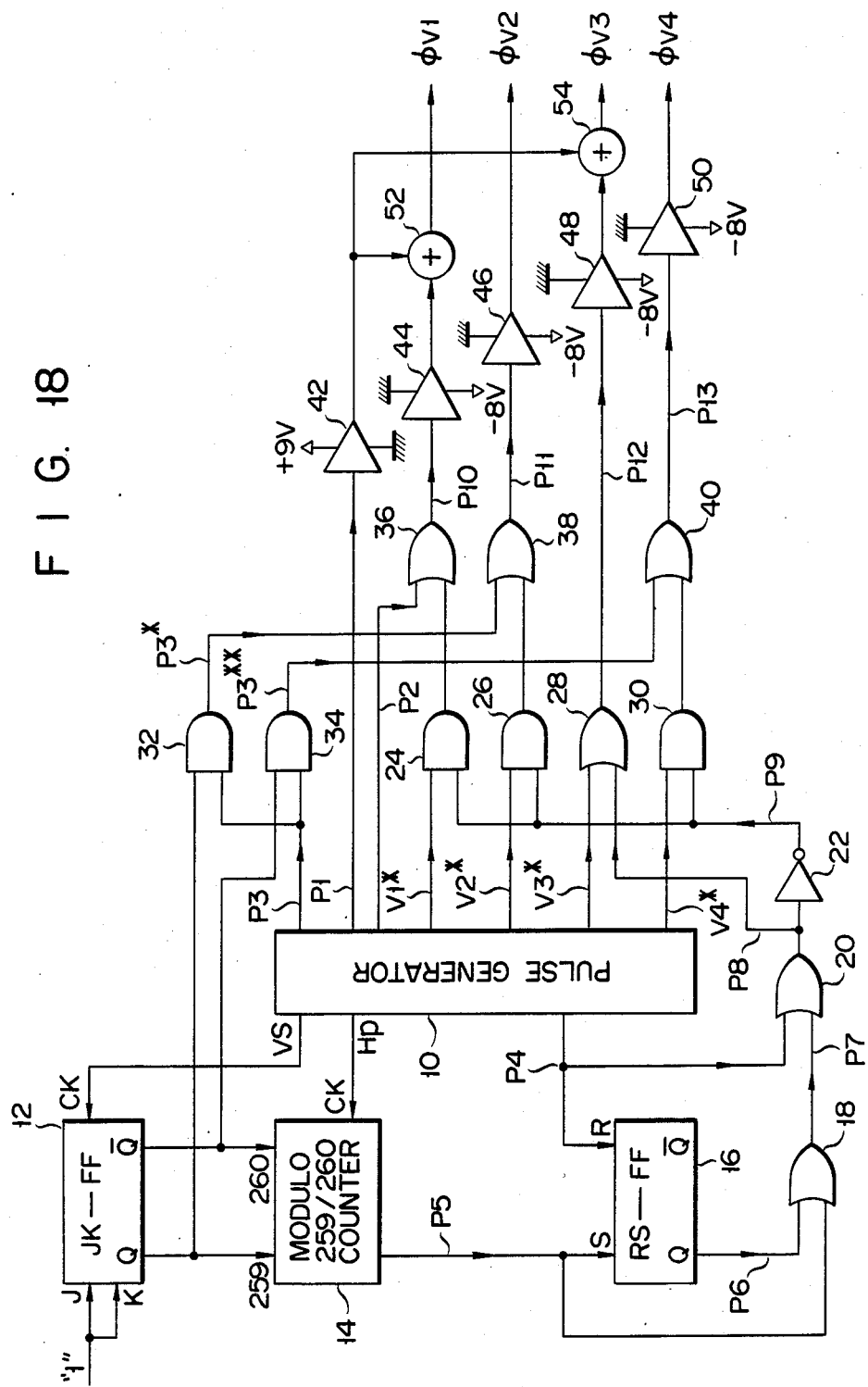
FIG. 18 shows a block configuration of the signal generator which generates the signals shown in FIGS. 3B-3E.

FIGS. 17A–17D show waveforms of various pulses explaining how vertical driving signals $\phi v1$–$\phi v4$, as shown in FIGS. 3B–3E, are obtained. FIG. 18 shows a block configuration of a signal generator which generates the signals shown in FIGS. 17A–17O.

In FIG. 18, vertical sync signal VS (FIG. 17A) is generated from pulse generator 10. Generator 10 also generates line shift pulse Hp, pulses P1–P4 and pulses V1*–V4*, synchronized with signal VS (FIGS. 17B–17G and 17L–17O). The rising edge of signal VS clocks JK flip-flop (JK-FF) 12. The J and K terminals of FF 12 are set at the logic "1" level, so that FF 12 serves as a triggered flip-flop (T-FF). FF 12 alternatively generates a Q output for modulo 259 counting and a $\overline{Q}$ output for modulo 260 counting, in synchronism with vertical sync signal VS.

Q and $\overline{Q}$ outputs from FF 12 are input to variable modulo 259/260 counter 14. Counter 14 also receives line shift pulse Hp from generator 10. When Q="1" and $\overline{Q}$="0", counter 14 serves as a modulo 259 counter and starts to count the pulse Hp (t102 in FIG. 17H) when the logic level of Q output is changed from "0" to "1". During the counting of pulse Hp, no output is obtained from counter 14. When counter 14 counts up 259 pulses of Hp under Q="1" and $\overline{Q}$="0", counter 14 generates count-up pulse P5 having the logic "1" level (t200–t202 in FIG. 17H). The logic "1" pulse P5 is retained until the subsequent vertical sync signal VS triggers FF 12 so that Q="0" and $\overline{Q}$="1".

When the outputs of FF 12 are Q="0" and $\overline{Q}$="1", counter 14 serves as a modulo 260 counter and starts to count the pulse Hp (t202 in FIG. 17H) when the logic level of $\overline{Q}$ output is changed from "0" to "1". During the counting of pulse Hp, no output is obtained from counter 14. When counter 14 counts up 260 pulses of Hp under Q="0" and $\overline{Q}$="1", counter 14 generates another count-up pulse P5 having the logic "1" level (t300-t302 in FIG. 17H). The logic "1" pulse P5 is retained until the subsequent vertical sync signal VS triggers FF 12 so that Q="1" and $\overline{Q}$="0".

Count-up pulse P5 is input to the S input of reset-set flip-flop (RS-FF) 16. Pulse P4 is input to the R input of RS-FF 16. FF 16 is set by pulse P5 and generates, from its Q output, pulse P6 having logic "1" level, FF 16 is reset by pulse P4 so that pulse P6 becomes logic "0". Q output pulse P6 is input to OR gate 18 which also receives count-up pulse P5. Gate 18 provides ORed pulse P7 having a logic "1" portion for the 5H period (FIG. 17I). Pulse P7 is input to OR gate 20 which also receives pulse P4. Gate 20 provides ORed pulse P8 having a logic "1" portion which is wider by the width of P4 than the 5H period (FIG. 17J). Pulse P8 is input to inverter 22. Inverter 22 provides inverted pulse P9 (FIG. 17K).

Pulse P9 is input to each of AND gates 24, 26 and 30. Pulse P8 is input to OR gate 28. Gates 24, 26, 28 and 30 receive pulses V1*, V2*, V3* and V4*, respectively. Pulse P3 from generator 10 is input to each of AND gates 32 and 34. Gates 32 and 34 respectively receive Q and $\overline{Q}$ outputs from FF 12. Gate 32 provides pulse P3* (FIG. 17E), and gate 34 provides pulse P3** (FIG. 17F). Pulse P1 from generator 10 is input to linear amplifier 42 which is powered by +9 V. Pulse P2 from generator 10 is input to OR gate 36 which also receives the ANDed output from gate 24. Pulse P3* from gate 32 is input to OR gate 38 which also receives the ANDed output from gate 26. Pulse P3** from gate 34 is input to OR gate 40 which also receives the ANDed output from gate 30. ORed output pulse P10 from gate 36 is input to linear amplifier 44 which is powered by −8 V. ORed output pulse P11 from gate 38 is input to linear amplifier 46 which is powered by −8 V. ORed output pulse P12 from gate 28 is input to linear amplifier 48 which is powered by −8 V. ORed output pulse P13 from gate 40 is input to linear amplifier 50 which is powered by −8 V.

An output signal (+9 V) from amplifier 42 is supplied to each of analog mixing circuits 52 and 54. An output signal (−8 V) from amplifier 44 is supplied to mixing circuit 52, and an output signal (−8 V) from amplifier 48 is supplied to mixing circuit 54. Driving signals $\phi v1$ and $\phi v3$ (+9 V, −8 V) are obtained from mixing circuits 52 and 54, respectively. Driving signals $\phi v2$, $\phi v4$ (−8 V) are obtained from amplifiers 46 and 50, respectively.

Incidentally, the number of pulses Hp eliminated from the portion before pulse Vp1 or Vp2 ($\phi v1$) can be freely determined according to the modulo of counter 14.

FIGS. 19A-19H show an example of the pulse intervals of pulses VS, Hp, V1*, V2*, V3*, V4*, P3 and P4 generated by the signal generator of FIG. 18. The rising edge of VS matches that of each of Hp, V1* and P4. The pulse widths of VS, Hp, V1* and P4 are 2 H, 5 μs, 3.5 μs and 10 μs, respectively (FIGS. 19A, 19B, 19C and 19H). The rising edge of V2* is delayed by 1 μs from that of VS. The pulse width of V2* is 3.5 μs (FIG. 19D). The falling edge of V3* is delayed by 0.5 μs from the rising edge of VS. The pulse width of V3* is 2.5 μs (FIG. 19E). The falling edge of V4* is delayed by 1.5 μs from the rising edge of VS. The pulse width of V4* is 2.5 μs (FIG. 19F). The rising edge of P3 is advanced by 5 μs from that of VS. The pulse width of P3 is 20 μs (FIG. 19G).

FIGS. 20A-20O show waveforms of various pulses generated by the signal generator of FIG. 18, which are obtained during an even field. The rising edge of each of Hp and P4 matches the falling edge of each of P2, P6, P7 and P10 (t106 in FIGS. 20A, 20C, 20F, 20H, 20I and 20L). The rising edge of P3* matches that of P11 (FIGS. 20D and 20M). The rising edge of each of P3* and P11 is advanced by 5 μs from that of Hp. The pulse width of each of P3* and P11 is 20 μs. The falling edge of each of P4 and P8 matches the rising edge of each of P9 and P13 (FIGS. 20F, 20J, 20K and 20O). The falling edge of each of P4 and P8 is delayed by 10 μs from the rising edge of Hp. The falling edge of each of P3* and P11 is delayed by 5 μs from that of P4.

FIGS. 21A-21O show waveforms of various pulses generated by the signal generator of FIG. 18, which are obtained during an even odd. The rising edge of P4 matches the falling edge of each of P2, P6, P7 and P10 (FIGS. 21C, 21F, 21H, 21I and 21L). The rising edge of P3 matches that of P13 (FIGS. 21E and 21O). The rising edge of each of P3 and P13 is advanced by 5 μs from that of P4. The pulse width of P3 is 20 μs (FIG. 21E). The falling edge of each of P4 and P8 matches the rising edge of P9 (FIGS. 21F, 21J and 21K). The falling edge of each of P4 and P8 is delayed by 10 μs from that of P2. The falling edge of P3 is delayed by 5 μs from that of P4.

Figure 22:
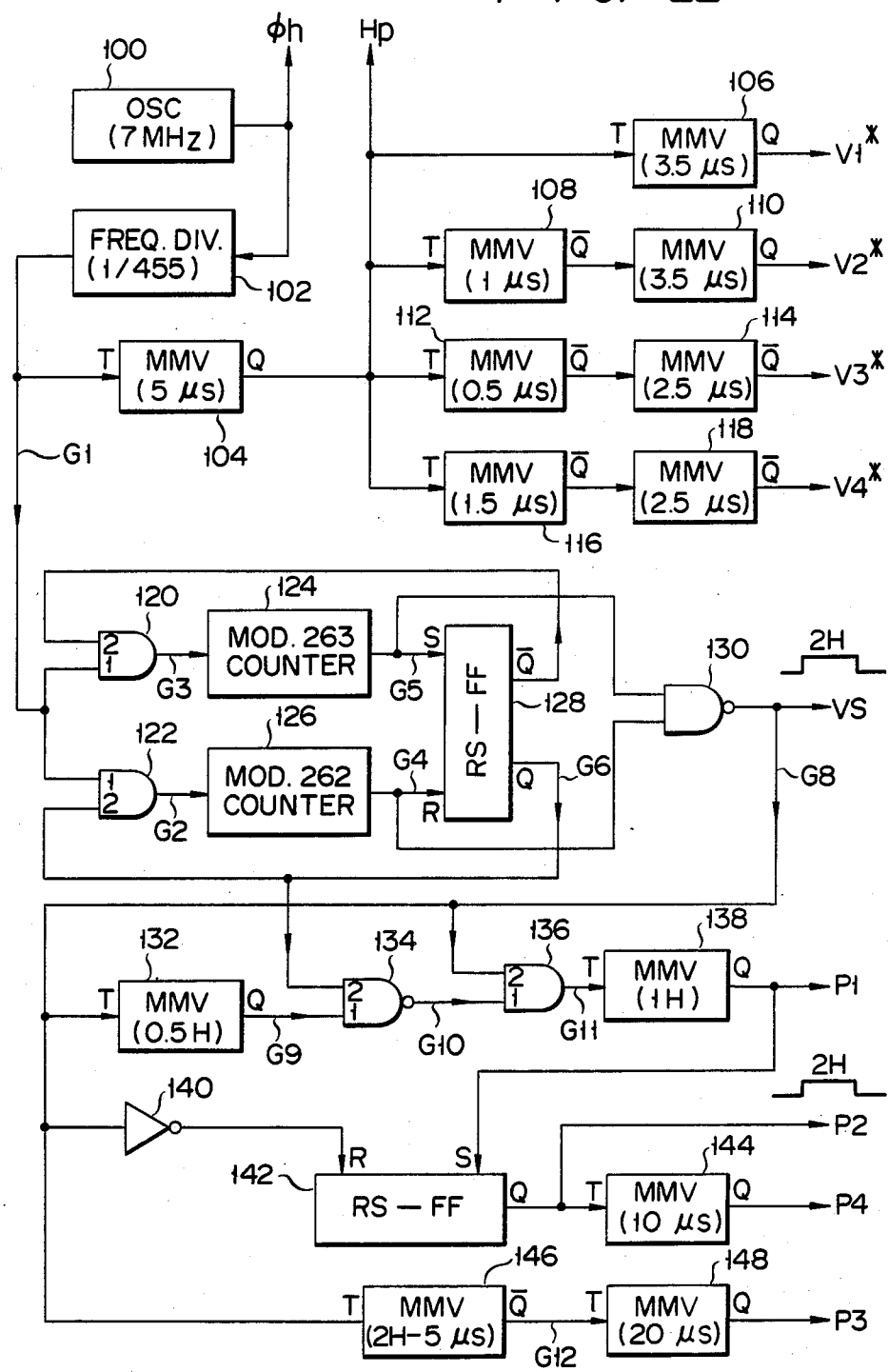
FIG. 22 shows details of pulse generator 10 used in the circuit of FIG. 18.
Figure 23:
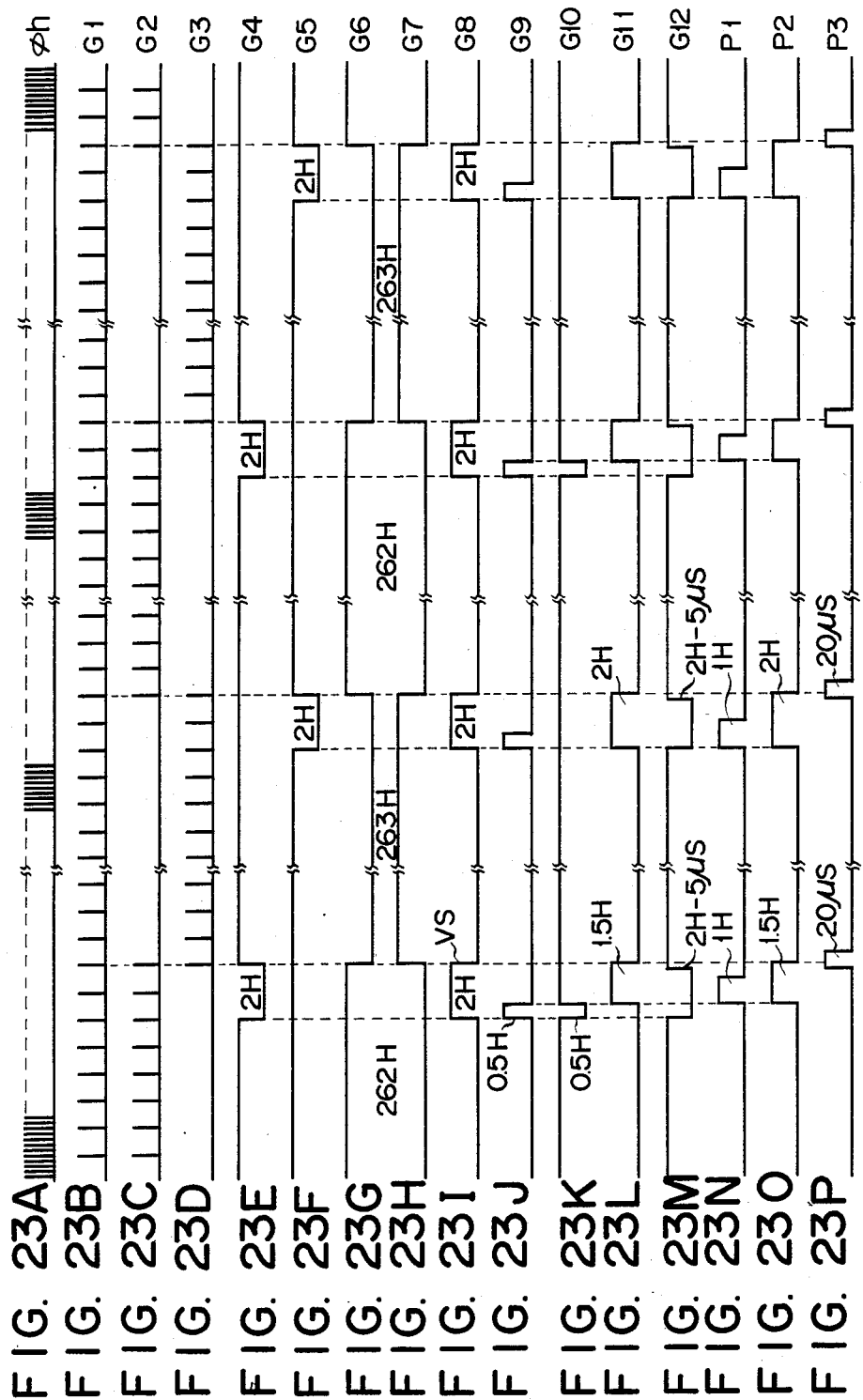
FIGS. 23A-23P show waveforms of various pulses generated by pulse generator 10 in FIG. 22.

FIG. 22 shows details of pulse generator 10 used in the circuit of FIG. 18. FIGS. 23A-23P show waveforms of various pulses generated by pulse generator 10 in FIG. 22. OSC 100 generates pulse train $\phi h$ with 7 MHz (FIG. 23A). The frequency of pulse $\phi h$ is devided by 455 by frequency divider 102. Frequency-divided pulse G1 (FIG. 23B) from divider 102 triggers monostable multivibrator (MMV) 104 so that MMV 104 delivers pulse Hp (FIG. 19B). The time constant of MMV 104 is selected such that the pulse width of Hp is 5 μs.

Pulse Hp from MMV 104 triggers MMV 106 so that MMV 106 delivers pulse V1* (FIG. 19C). The time constant of MMV 106 is selected such that the pulse width of V1* is 3.5 μs. Pulse Hp also triggers MMVs 108, 112 and 116. The pulse edge of Hp is delayed by 1 μs by MMV 108. The delayed pulse obtained from MMV 108 triggers MMV 110 so that MMV 110 delivers pulse V2* (FIG. 19D). The time constant of MMV 110 is selected such that the pulse width of V2* is 3.5 μs. The pulse edge of Hp is delayed by 0.5 μs by MMV 112. The delayed pulse obtained from MMV 112 triggers MMV 114 so that MMV 114 delivers pulse V3* (FIG. 19E). The time constant of MMV 114 is selected such that the pulse width of V3* is 2.5 μs. The pulse edge of Hp is delayed by 1.5 μs by MMV 116. The delayed pulse obtained from MMV 116 triggers MMV 118 so that MMV 118 delivers pulse V4* (FIG. 19F). The time constant of MMV 118 is selected such that the pulse width of V4* is 2.5 μs.

Pulse G1 is supplied to each first input of AND gates 120 and 122. ANDed output pulse G2 (FIG. 23C) from gate 122 clocks modulo 262 counter 126. ANDed output pulse G3 (FIG. 23D) from gate 120 clocks modulo 263 counter 124. Count-up pulse G4 (FIG. 23E) from counter 126 resets RS-FF 128. Count-up pulse G5 (FIG. 23F) from counter 124 sets RS-FF 128. Counters 124 and 126 ae so designed that the pulse width of each of pulses G5 and G4 are 2H. Pulse G6 (FIG. 23G) fron noninverted output Q of FF 128 is fed back to the second input of AND gate 122. Pulse G7 (FIG. 23H) from inverted output $\overline{Q}$ of FF 128 is fed back to the second input of AND gate 120. Pulses G4 and G5 are input to NAND gate 130. NANDed output pulse G8 (FIG. 23I) from gate 130 is used as vertical sync signal VS (FIG. 17A, etc.).

Pulse G8 from NAND gate 130 triggers MMV 132 so that MMV 132 delivers pulse G9 (FIG. 23J). The time constant of MMV 132 is selected such that the pulse width of G9 is 0.5H. Pulse G9 from MMV 132 and pulse G6 from FF 128 are input to NAND gate 134. NANDed output pulse G10 (FIG. 23K) from gate 134 and pulse G8 from gate 130 are input to AND gate 136. ANDed output pulse G11 (FIG. 23L) from gate 136 triggers MMV 138 so that MMV 138 delivers pulse P1 (FIG. 23N). The time constant of MMV 138 is selected such that the pulse width of P1 is 1H.

Pulse G8 from NAND gate 130 is phase-inverted via inverter 140. The inverted pulse from inverter 140 resets RS-FF 142. FF 142 is set by pulse P1 from MMV 138. Noninverted output Q of FF 142 is used as pulse P2 (FIG. 23O). Pulse P2 from FF 142 triggers MMV 144 so that MMV 144 delivers pulse P4 (FIG. 19H, etc.). The time constant of MMV 144 is selected such that the pulse width of P4 is 10 μs. Pulse G8 also triggers MMV 146. The pulse edge of G8 is delayed by (2H−5 μs) by MMV 146. Delayed pulse G12 (FIG. 23M) obtained from MMV 146 triggers MMV 148 so that MMV 148 delivers pulse P3 (FIG. 23P). The time constant of MMV 148 is selected such that the pulse width of P3 is 20 μs.

FIGS. 12A-12D show waveforms of vertical driving signals $\phi v1$-$\phi v4$ for a two-dimensional, CCD image sensor, which are provided for another embodiment of the present invention. According to the driving signals of FIGS. 12A-12D, just before generating each field shift pulse Vp1 and Vp2, the potential of all of signals $\phi v1$-$\phi v4$ is temporarily rendered to be −8 V, so that unnecessary charges under electrodes V1-V4 (FIG. 1) disappear by charge recombination. The waveform of signal $\phi v3$ in FIG. 12C differs from that in FIG. 3D.

Figure 24:
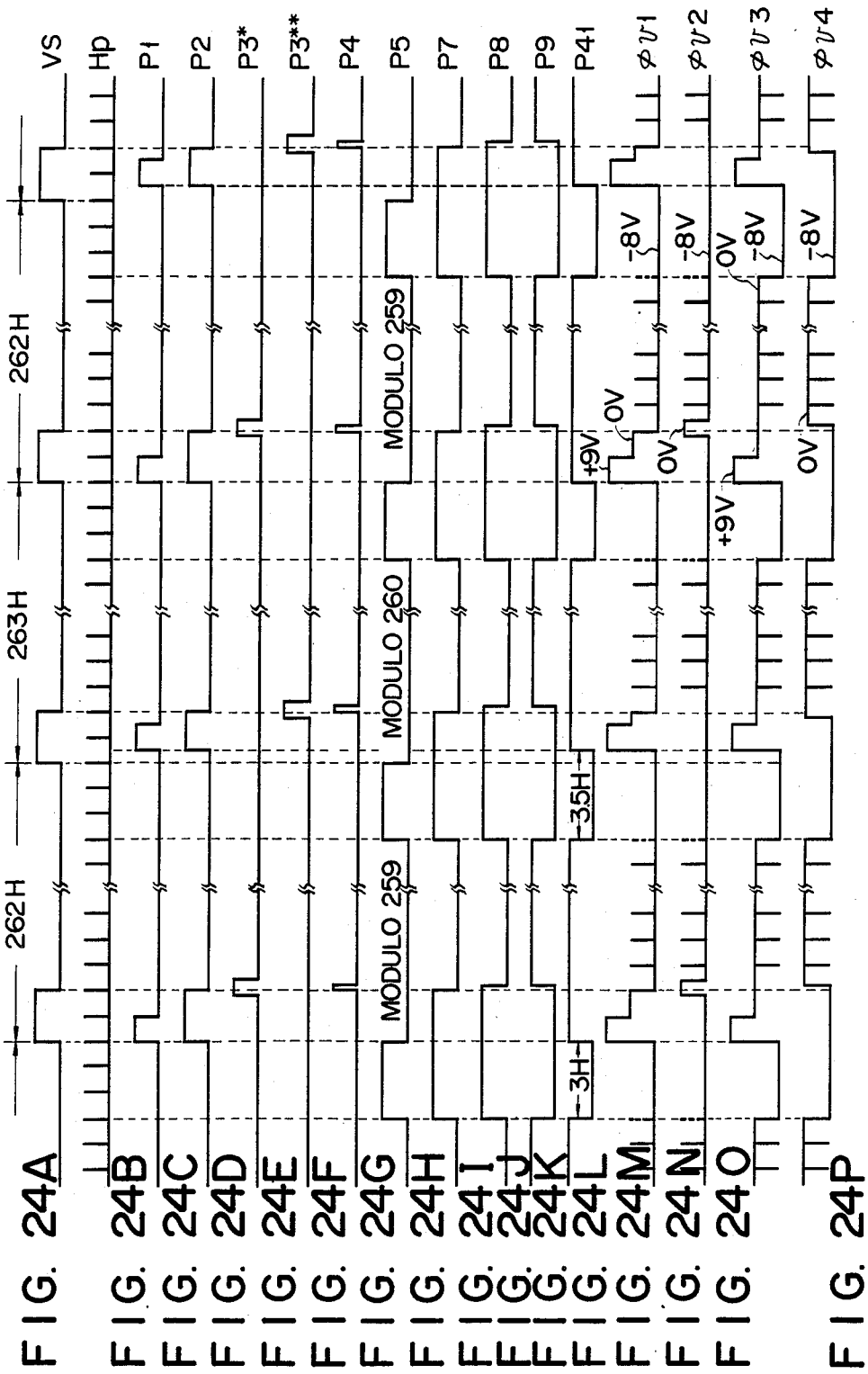
FIGS. 24A-24P show waveforms of various pulses explaining how vertical driving signals $\phi v1$-$\phi v4$, shown in FIGS. 12A-12D, are obtained.

FIGS. 24A-24P show waveforms of various pulses explaining how vertical driving signals $\phi v1$-$\phi v4$, shown in FIGS. 12A-12D, are obtained. FIG. 25 shows a block configuration of the signal generator which generates the signals shown in FIGS. 24M-24P.

The configuration of FIG. 25 is different from that of FIG. 18 with respect to the circuit for generating signal $\phi v3$ (FIG. 24O). Thus, pulse P5 from counter 14 resets RS-FF 41, and pulse P2 from generator 10 sets FF 41. Pulse P41 (FIG. 24L) from inverted output $\overline{Q}$ of FF 41 is input to AND gate 39. The output from OR gate 28 is also input to gate 39. ANDed output pulse P12* thus obtained from gate 39 is used for pulse P12 of FIG. 18 circuit.

FIGS. 13A-13D show waveforms of vertical driving signals $\phi v1$-$\phi v4$ for a two-dimensional, CCD image sensor, which are provided for still another embodiment of the present invention. In the driving signals of FIGS. 13A-13D, front porch Fp is provided just before each field shift pulse Vp1 and Vp2, so that the potential change range (0 V→9 V) of each of pulses Vp1 and Vp2 in signal $\phi v1$ matches that of each of pulses Vp1 and Vp2 in signal $\phi v3$. The width of front porch Fp and of pulses Vp1 and Vp2 may be equal to 1H. This front porch width can be optionally determined according to the time constant of the low-pass filter circuit shown in FIG. 6C. When the driving signals of FIGS. 13A-13D are employed, a white defect, caused by modulating the potential of the CCD substrate with a large amplitude, can be avoided.

Figure 26:
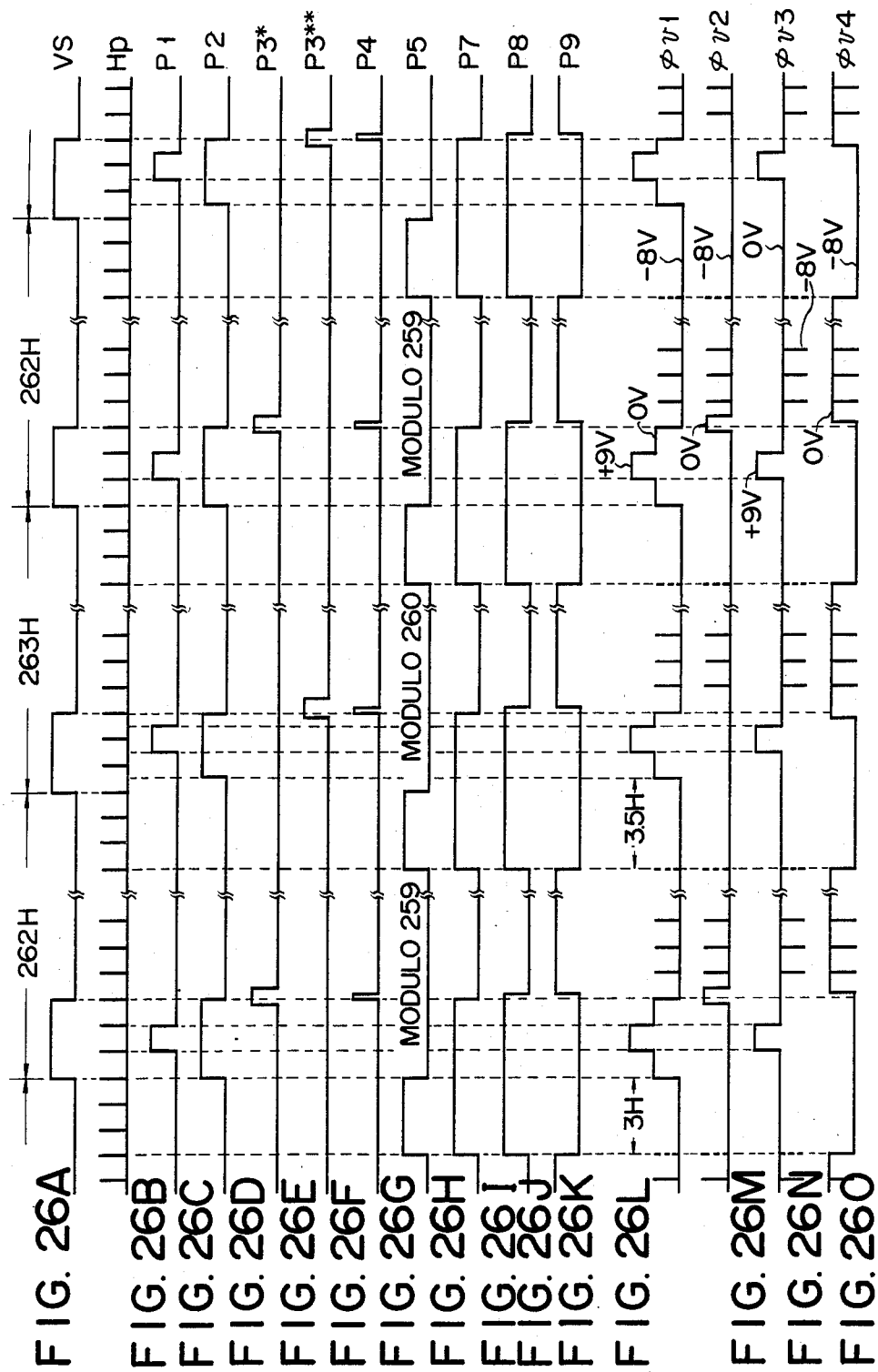
FIGS. 26A-26O show waveforms of various pulses explaining how vertical driving signals $\phi v1$-$\phi v4$, shown in FIGS. 13A-13D, are obtained.
Figure 27:
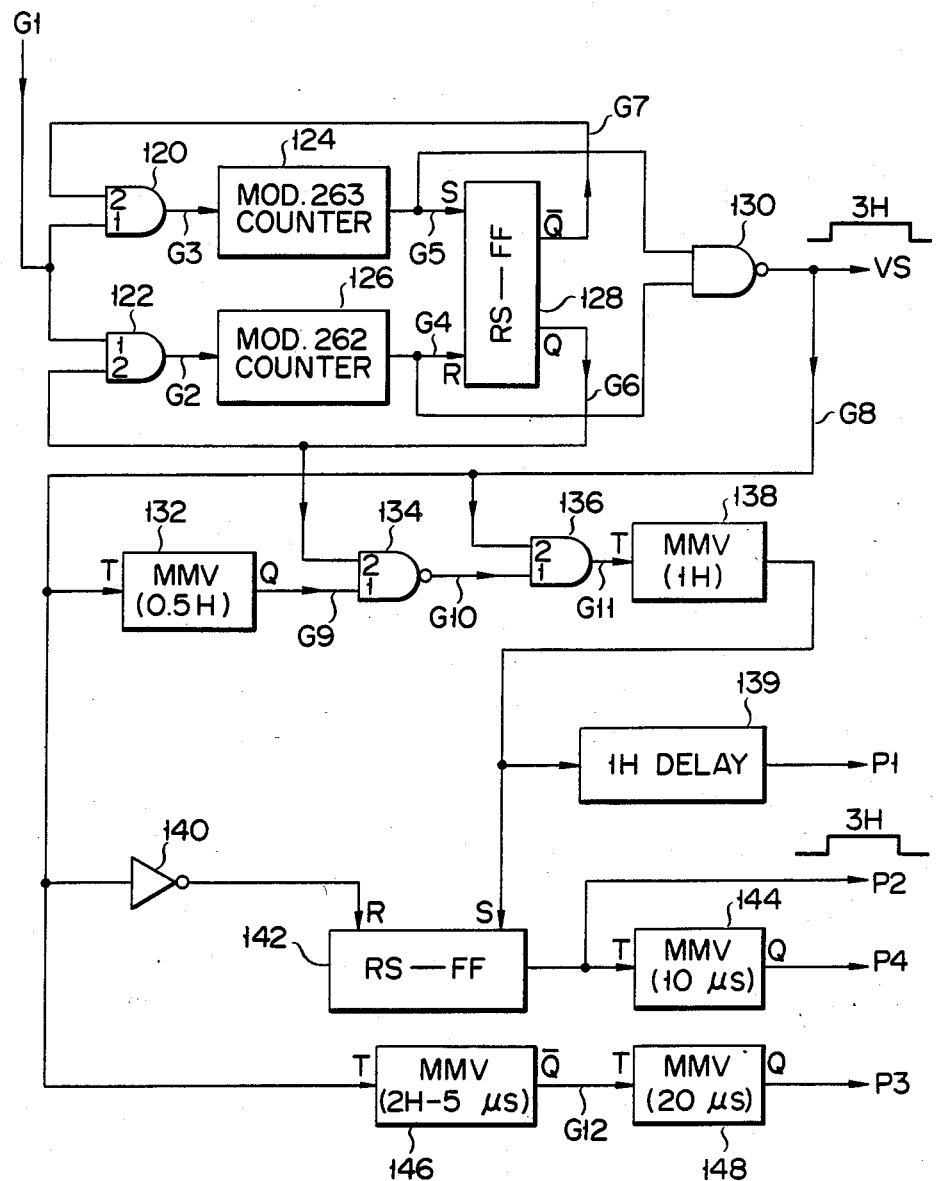
FIG. 27 shows a block configuration of the pulse generator which is adapted to the circuit of FIG. 18 so that the signals shown in FIGS. 13A-13D are obtained.

FIGS. 26A-26D show waveforms of various pulses explaining how vertical driving signals $\phi v1$-$\phi v4$, shown in FIGS. 13A-13D, are obtained. FIG. 27 shows a block configuration of the pulse generator which is adapted to the circuit of FIG. 18 so that the signals shown in FIGS. 26L-26O are obtained.

The configuration of FIG. 27 is different from that of FIG. 22 with respect to the circuit for generating VS and P1. Thus, counters 124 and 126 are designed such that the pulse width of each of pulses G5 and G4 are 3H. Then, signal VS with 3H width can be obtained from NAND gate 130 (FIG. 26A). Further, the output with 1H width from MMV 138 is delayed by 1H by 1H delay circuit 139. Circuit 139 may be made of a D type flip-flop. Pulse P1 (FIG. 26C) used for obtaining signal $\phi v1$ of FIG. 13A is delivered from circuit 139.

FIGS. 14A-14D show waveforms of vertical driving signals $\phi v1$-$\phi v4$ for a two-dimensional, CCD image sensor, which are the combination of FIGS. 12A-12D and 13A-13D. Thus, in the driving signals of FIGS. 14A-14D, before generating each field shift pulse Vp1 and Vp2, the potential of all of signals $\phi v1$-$\phi v4$ is temporarily rendered to be −8 V, so that unnecessary charges under electrodes V1-V4 (FIG. 1) disappear by charge recombination. Further, front porch Fp is provided just before each field shift pulse Vp1 and Vp2, so that the potential change range (0 V→9 V) of each of pulses Vp1 and Vp2 in signal $\phi v1$ matches that of each of pulses Vp1 and VP2 in signal $\phi v3$.

Figure 28:
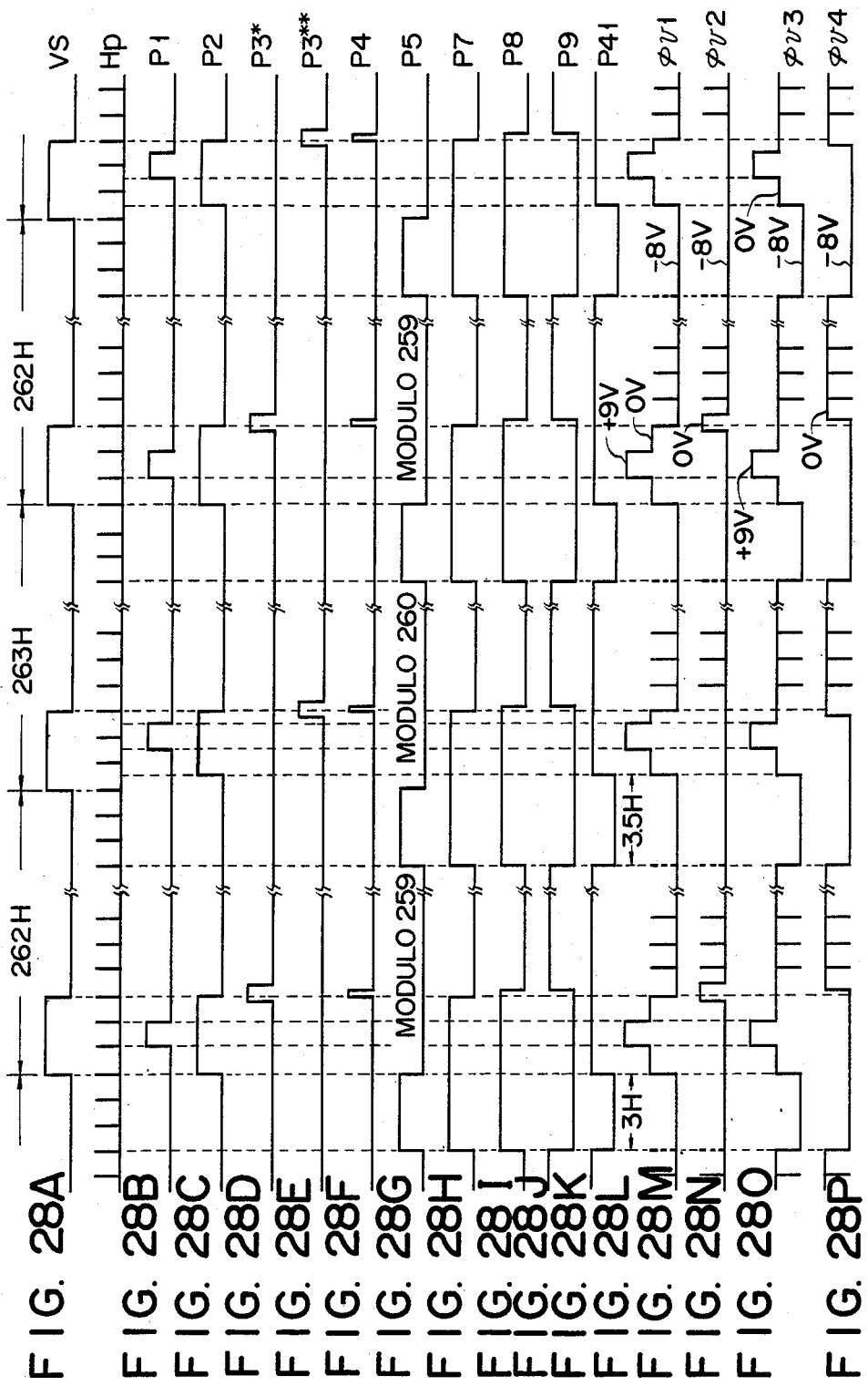
FIGS. 28A-28P show waveforms of various pulses explaining how vertical driving signals $\phi v1$-$\phi v4$, shown in FIGS. 14A-14D, are obtained.

FIGS. 28A-28P show waveforms of various pulses explaining how vertical driving signals $\phi v1$- v4, shown in FIGS. 14A-14D, are obtained. Signals $\phi v1$-$\phi v4$ shown in FIGS. 28M-28P can be obtained by the signal generator of FIG. 25 which is incorporated with the pulse generator of FIG. 27.

FIGS. 15A-15E show waveforms of photo-gate signal $\phi pg$ and vertical driving signals $\phi v1$-$\phi v4$, which are provided in yet another embodiment of the present invention. These signals of FIGS. 15A-15E are applied to a two-dimensional, CCD image sensor having photogate electrodes respectively formed between photodiodes 901 and vertical transmission registers 902. Each of the photo-gate electrodes receives photo-gate signal $\phi pg$ (FIG. 15A) which is synchronized with vertical sync signal VS. The signal charge transfer from photodiodes 901 to vertical transmission registers 902 is controlled by photo-gate signal $\phi pg$. The combination of the signal waveforms in FIGS. 15A and 15B corresponds to the signal waveform in FIG. 3B.

Figure 29:
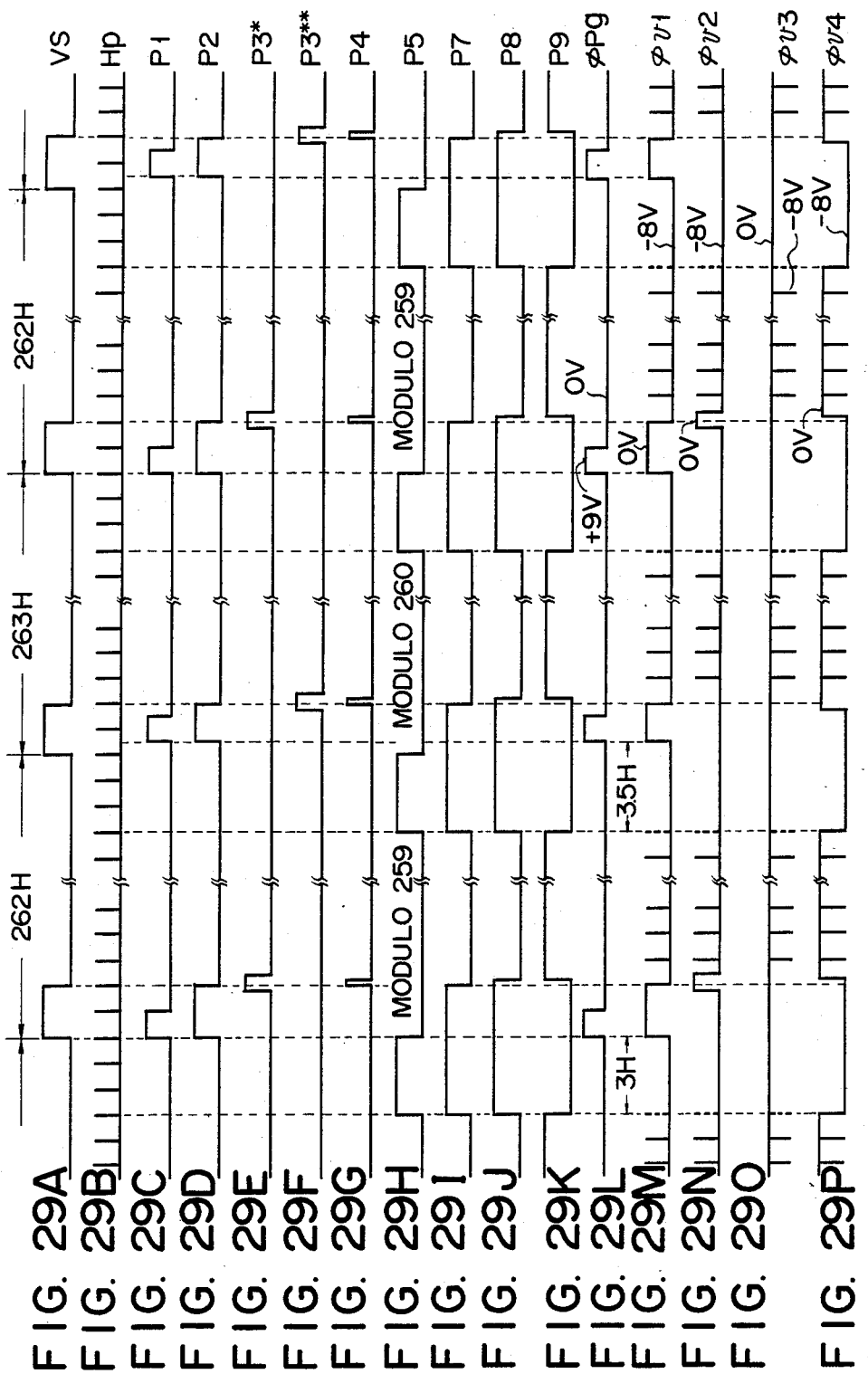
FIGS. 29A-29P show waveforms of various pulses explaining how photo-gate signal $\phi pg$ and vertical driving signals $\phi v1$-$\phi v4$, shown in FIGS. 15A-15E, are obtained.
Figure 30:
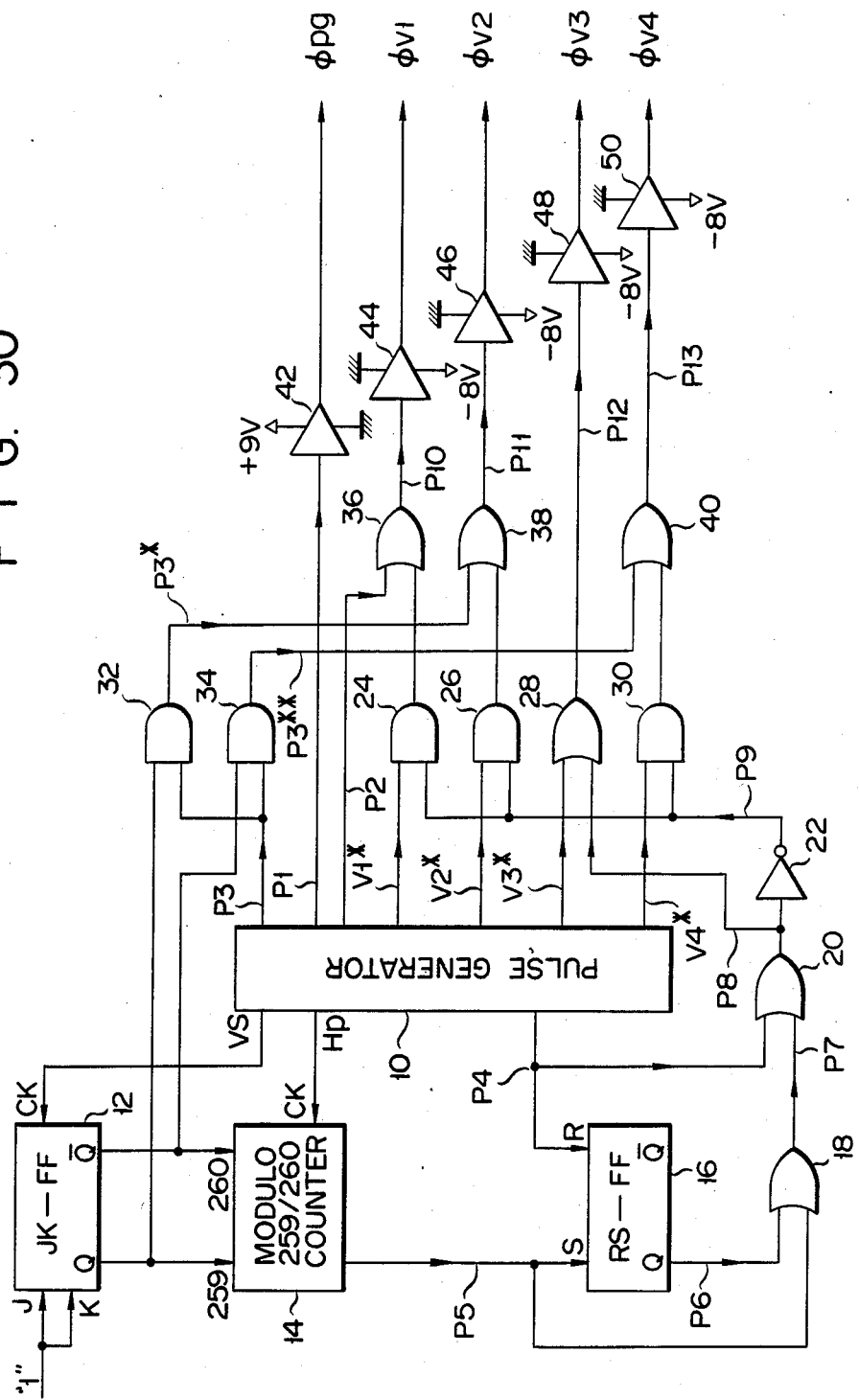
FIG. 30 shows a block configuration of the signal generator which generates the signals shown in FIGS. 15A-15E.

FIGS. 29A-29P show waveforms of various pulses explaining how vertical driving signals $\phi v1$-$\phi v4$, shown in FIGS. 15A-15E, are obtained. FIG. 30 shows a block configuration of the signal generator which generates the signals shown in FIGS. 15A-15E.

FIG. 30 is different from FIG. 18 with respect to the circuit for generating signals $\phi pg$, $\phi v1$ and $\phi v3$ (FIG. 29L, 29M and 29O). The configuration of FIG. 30 differs from FIG. 18 in that the output signal from amplifier 42 is directly used as signal $\phi pg$, that the output signal from amplifier 44 is directly used as signal $\phi v1$, and that the output signal from amplifier 48 is directly used as signal $\phi v3$.

Incidentally, as in the case of FIG. 12C or 14C, a low potential portion (0 V of FIG. 15D; $-8$ V for FIGS. 12C or 14C) may be provided in signal $\phi v3$ of FIG. 15D at each portion preceding the field shift pulse, so that unnecessary charges under electrodes V1-V4 (FIG. 1) disappear by charge recombination.

FIG. 31 shows a block configuration of the signal generator which generates the signals shown in FIGS. 16A-16F. The pulse generator of FIG. 22 may be used for generator 10 in FIG. 31. Pulse Hp from generator 10 and pulse P8 from OR gate 20 are input to NOR gate 60. The NORed output from gate 60 is supplied to AND gate 62. Gate 62 also receives pulse $\phi h$ from OSC 100 (FIG. 22) provided in generator 10. The ANDed output from gate 62 is converted to pulse $\phi h1$ (FIG. 16E) via linear amplifier 66 which is powered by $+9$ V. The ANDed output from gate 62 is converted to pulse $\phi h2$ (FIG. 16F) via inverter 64 and linear amplifier 68 which is powered by $+9$ V.

Figures 16A, 16B, 16C, 16D, 16E, 16F:
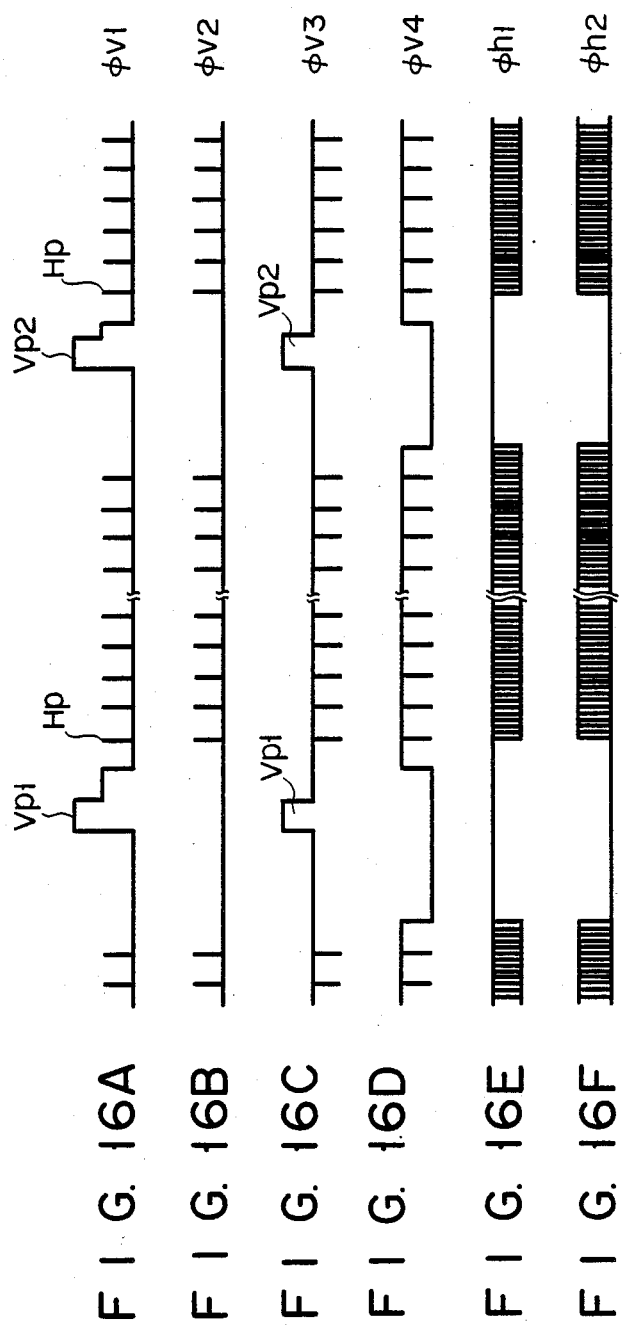
FIGS. 16A-16D show waveforms of vertical driving signals $\phi v1$-$\phi v4$ used for a two-dimensional, CCD image sensor, which are provided in another embodiment of the present invention.
FIGS. 16E and 16F show waveforms of horizontal driving signals $\phi h1$ and $\phi h2$ used together with the signals of FIGS. 16A-16D.

In the embodiment of FIG. 18, etc., a line shift, pulse elimination period (e.g., 11 in FIG. 3B) is provided only before the start of each field shift. However, when the operation of vertical transmission registers 902 causes a deviation in the initial potential of photodiodes 901, even if the line shift pulse elimination period is provided as shown in FIGS. 16A-16D, said flickering could occur. The reason why such an initial potential deviation is caused resides in the fact that, at the end portion of a photo-sensitive region in the CCD image sensor, certain vertical transmission registers 902 are capacitively coupled to horizontal transmission register 903. To prevent the flickering due to such capacitive coupling, horizontal transferring pulses $\phi h1$ and $\phi h2$ are partially eliminated as shown in FIGS. 16E and 16F, so that horizontal transmission register 903 is stopped when field shifting is performed.

The present invention should not be limited to the embodiment disclosed herein. This invention may be embodied in various ways without departing from the scope of the invention as claimed. For instance, the analog circuit of elements 42-54 in FIG. 18, etc., may be replaced with a conventional switching circuit to obtain signals $\phi v1-\phi v4$. The present invention may be applied to an interline transmission-type, two-dimensinal, CCD image sensor having photo-gates and/or shift-gates. Of course, an image sensor whose photo-sensitive element is formed of MOS diodes may be adapted. Also, the present invention may be applied to an X-Y address-type, two-dimensional, MOS image sensor in which the occurrence of flickering could be invited due to vertical address pulses.

What is claimed is:

1. A driver circuit for an image sensor operating in a field storage mode in which field shifting including even field shifting and odd field shifting is carried out, said image sensor having a two-dimensional optical area including photo-sensitive elements providing signal charges representing an image formed on said optical area, and having register means for transferring the signal charges from said photosensitive elements to outside of said image sensor in accordance with given signals provided thereto, said register means including vertical transmission register means for transferring signal charges along the vertical direction of said two-dimensional optical area, said driver circuit comprising:

generator means for generating and providing said given signals to said register means, said given signals including vertical driving signals applied to said vertical transmission register means to transfer signal charges along the vertical direction, each of said vertical driving signals including field shift pulses effecting said even or odd field shifting and including line shift pulses effecting line shifting which is repeated during field shifting;

circuit means, coupled to said generator means, for stopping signal charge transferring by said register means for a given period of time, so that the amplitude of a first signal component of said given signals used for even field shifting substantially matches the amplitude of a second signal component contained in said given signals used for odd field shifting;

wherein said vertical driving signals comprise a first vertical driving signal which is applied to first horizontal arrays of said photo-sensitive elements, and a second vertical driving signal which is applied to second horizontal arrays of said photo-sensitive elements; and wherein said circuit means includes potential adjusting means for adjusting said second vertical driving signal such that the potential of said second vertical driving signal substantially matches that of said first vertical driving signal for a fixed period within said given period of time.

2. A driver circuit according to claim 1, wherein said vertical driving signals comprise a first vertical driving signal which is applied to first horizontal arrays of said photo-sensitive elements and a second vertical driving signal which is applied to second horizontal arrays of said photo-sensitive elements;

wherein said circuit means includes first potential adjusting means for adjusting said first vertical driving signal such that the potential of said first vertical driving signal substantially matches that of said second vertical driving signal for a fixed period after which said field shift pulse is generated; and wherein said circuit means includes second potential adjusting means for adjusting said second vertical driving signal such that the potential of said second vertical driving signal substantially matches that of said first vertical driving signal for another fixed period within said given period of time.

3. A driver circuit according to claim 1, wherein said vertical driving signals comprise a photo-gate signal for controlling said signal charge transferring operation, a first vertical driving signal which is applied to first horizontal arrays of said photo-sensitive elements and a second vertical driving signal which is applied to second horizontal arrays of said photo-sensitive elements.

4. A driver circuit according to claim 1, wherein said register means includes horizontal transmission register means for performing said signal charge transferring operation along the horizontal direction of said two-dimensional optical area;

wherein said given signals include horizontal transferring signals which are applied to said horizontal transmission register means to achieve said signal charge transferring operation along the horizontal direction for each said field shifting;

and wherein said circuit means includes horizontal transferring signal elimination means for stopping the generation of said horizontal transferring signals during the time when said field shifting is effected.

5. A driver circuit according to claim 1, wherein said register means further includes horizontal transmission register means for performing said signal charge transferring operation along the horizontal direction of said two-dimensional optical area;
   wherein said given signals include horizontal transferring signals which are applied to said horizontal transmission register means to achieve said signal charge transferring operation along the horizontal direction for each said field shifting;
   and wherein said circuit means includes horizontal transferring signal elimination means for stopping the generation of said horizontal transferring signals during the time when said field shifting is effected.

6. A driver circuit according to claim 1, wherein said circuit means includes means for prohibiting the generation of all of said given signals.

7. A driver circuit for an image sensor operating in a field storage mode in which field shifting including even field shifting and odd field shifting is carried out, said image sensor having a two-dimensional optical area including photo-sensitive elements providing signal charges representing an image formed on said optical area, and having register means for transferring the signal charges from said photo-sensitive elements to outside of said image sensor in accordance with given signals provided thereto, said register means including vertical transmissionn register means for transferring signal charges along the vertical direction of said two-dimensional optical area, said driver circuit comprising:
   generator means for generating and providing said given signals to said register means, said given signals including vertical driving signals applied to said vertical transmission register means to transfer signal charges along the vertical direction, each of said vertical driving signals including field shift pulses effecting said even or odd field shifting and including line shift pulses effecting line shifting which is repeated during field shifting; and
   circuit means, coupled to said generator means, for stopping signal charge transferring by said register means for a given period of time, so that the amplitude of a first signal component of said given signals used for even field shifting substantially matches the amplitude of a second signal component contained in said given signals used for odd field shifting,
   wherein said vertical driving signals comprise a first vertical driving signal which is applied to first horizontal arrays of said photo-sensitive elements, and a second vertical driving signal which is applied to second horizontal arrays of said photo-sensitive elements;
   wherein said circuit means including pulse elimination means for eliminating a predetermined number of said line shift pulses before the generation of each of said field shift pulses, stopping signal charge transferring for said given period of time; and
   wherein said circuit means also includes potential adjusting means for adjusting said second vertical driving signal such that the potential of said second vertical driving signal substantially matches that of said first vertical driving signal for a fixed period within said given period of time.

8. A driver circuit according to claim 7, wherein said vertical driving signals comprise a first vertical driving signal which is applied to first horizontal arrays of said photo-sensitive elements and a second vertical driving signal which is applied to second horizontal arrays of said photo-sensitive elements; and
   wherein said circuit means includes potential adjusting means for adjusting said first vertical driving signal such that the potential of said first vertical driving signal substantially matches that of said second vertical driving signal for a predetermined period in which said field shift pulse is contained.

9. A driver circuit according to claim 7, wherein said vertical driving signals comprise a first vertical driving signal which is applied to first horizontal arrays of said photo-sensitive elements and a second vertical driving signal which is applied to second horizontal arrays of said photo-sensitive elements;
   wherein said circuit means includes first potential adjusting means for adjusting said first vertical driving signal such that the potential of said first vertical driving signal substantially matches that of said second vertical driving signal for a fixed period after which said field shift pulse is generated; and
   wherein said circuit means includes second potential adjusting means for adjusting said second vertical driving signal such that the potential of said second vertical driving signal substantially matches that of said first vertical driving signal for another fixed period within said given period of time.

10. A driver circuit according to claim 5, wherein said vertical driving signals comprise a photo-gate signal for controlling said signal charge transferring operation, a first vertical driving signal which is applied to given horizontal arrays of said photo-sensitive elements and a second vertical driving signal which is applied to other given horizontal arrays of said photo-sensitive elements.

11. A driver circuit according to claim 7, wherein said register means further includes horizontal transmission register means for performing said signal charge transferring operation along the horizontal direction of said two-dimensional optical area;
   wherein said given signals include horizontal transferring signals which are applied to said horizontal transmission register means to achieve said signal charge transferring operation along the horizontal direction for each said field shifting;
   and wherein said circuit means includes horizontal transferring signal elimination means for stopping the generation of said horizontal transferring signals during the time when said field shifting is effected.

12. A driver circuit according to claim 1, wherein said circuit means includes means for prohibiting the generation of all of said given signals.

13. A driver circuit according to claim 7, wherein said vertical driving signals comprise a first vertical driving signal which is applied to first horizontal arrays of said photo-sensitive elements and a second vertical driving signal which is applied to second horizontal arrays of said photo-sensitive elements;
   wherein said circuit means includes first potential adjusting means for adjusting said first vertical driving signal such that the potential of said first vertical driving signal substantially matches that of said second vertical driving signal for a fixed period after which said field shift pulse is generated; and wherein said circuit means includes second potential adjusting means for adjusting said second vertical driving signal such that the potential of said second vertical driving signal substantially matches that of said first vertical driving signal for another fixed period within said given period of time.

14. A driver circuit according to claim 7, wherein said vertical driving signals comprise a photo-gate signal for controlling said signal charge transferring operation, a first vertical driving signal which is applied to first horizontal arrays of said photo-sensitive elements and a second vertical driving signal which is applied to second horizontal arrays of said photo-sensitive elements.

15. A driver circuit according to claim 7, wherein said register means includes horizontal transmission register means for performing said signal charge transferring operation along the horizontal direction of said two-dimensional optical area;

wherein said given signals include horizontal transferring signals which are applied to said horizontal transmission register means to achieve said signal charge transferring operation along the horizontal direction for each of said field shifting;

and wherein said circuit means includes horizontal transferring signal elimination means for stopping the genertion of said horizontal transferring signals during the time when said field shifting is effected.

16. A driver circuit according to claim 7, wherein said register means further includes horizontal transmission register means for performing said signal charge transferring operation along the horizontal direction of said two-dimensional optical area;

wherein said given signals include horizontal transferring signals which are applied to said horizontal transmission register means to achieve said signal charge transferring operation along the horizontal direction for each of said field shift;

and wherein said circuit means includes horizontal transferring signal elimination means for stopping the generation of said horizontal transferring signals during the time when said field shifting is effected.

17. A driver circuit for an image sensor operating in a field storage mode in which field shifting including even field shifting and odd field shifting is carried out, said image sensor having a two-dimensional optical area including photo-sensitive elements providing signal charges representing an image formed on said optical area, and having register means for transferring the signal charges from said photosensitive elements to outside of said image sensor in accordance with given signals provided thereto, said register means including vertical transmission register means for transferring signal charges along the vertical direction of said two-dimensional optical area, said driver circuit comprising:

generator means for generating and providing said given signals to said register means, said given signals including vertical driving signals applied to said vertical transmission register means to transfer signal charges along the vertical direction, each of said vertical driving signals including field shift pulses effecting said even or odd field shifting and including line shift pulses effecting line shifting which is repeated during field shifting; and circuit means coupled to said generator means, for stopping signal charge transferring by said register means for a given period of time, so that the amplitude of a first signal component of said given signals used for even field shifting subtantially matches the amplitude of a second signal component contained in said given signals used for odd field shifting;

wherein said vertical driving signals comprise a first vertical driving signal which is applied to first horizontal arrays of said photo-sensitive elements and a second vertical driving signal which is applied to second horizontal arrays of said photo-sensitive elements;

wherein said circuit means including pulse elimination means for eliminating a predetermined number of said line shift pulses before the generation of each of said field shift pulses, stopping signal charge transferring for said given period of time; and wherein said circuit means also includes potential adjusting means for adjusting said first vertical driving signal such that the potential of said first vertical driving signal substantially matches that of said second vertical driving signal for a predetermined period in which said field shift pulse is contained.

18. A driver circuit according to claim 17, wherein said circuit means includes means for prohibiting the generation of all of said given signals.

19. A driver circuit according to claim 17, wherein said vertical driving signals comprise a first vertical driving signal which is applied to first horizontal arrays of said photo-sensitive elements and a seond vertical driving signal which is applied to second horizontal arrays of said photo-sensitive elements;

wherein said circuit means includes first potential adjusting means for adjusting said first vertical driving signal such that the potential of said first vertical driving signal substantially matches that of said second vertical driving signal for a fixed period after which said field shift pulse is generated and wherein said circuit means includes second potential adjusting means for adjusting said second vertical driving signal such that the potential of said econd vertical driving signal substantially matches that of said first vertical driving signal for another fixed period within said given period of time.

20. A driver circuit according to claim 17, wherein said vertical driving signals comprise a photo-gate signal for controlling said signal charge transferring operation, a first vertical driving signal which is applied to first horizontal arrays of said photo-sensitive elements and a second vertical driving signal which is applied to second horizontal arrays of said photo-sensitive elements.

21. A driver circuit according to claim 17, wherein said register means includes horizontal transmission register means for performing said signal charge transferring operation along the horizontal direction of said two-dimensional optical area;

wherein said given signals include horizontal transferring signals which are applied to said horizontal transmission register means to achieve said signal charge transferring operation along the horizontal direction for each of said field shifting;

and wherein said circuit means includes horizontal transferring signal elimination means for stopping the generation of said horizontal transferring signals during the time when said field shifting is effected.

22. A driver circuit according to claim 17, wherein said register means further includes horizontal transmission register means for performing said signal charge transferring operation along the horizontal direction of said two-dimensional optical area; wherein said given signals include horizontal transferring signals which are applied to said horizontal transmission register means to achieve said signal charge transferring operation along the horizontal direction for each of said field shift;

and wherein aid circuit means includes horizontal transferring signal elimination means for stopping the generation of said horizontal transferring signals during the time when said field shifting is effected.

* * * * *